United States Patent
Lin et al.

(10) Patent No.: US 10,054,806 B2
(45) Date of Patent: Aug. 21, 2018

(54) SEGMENTED ELECTRO-ABSORPTION MODULATION

(71) Applicant: Xilinx, Inc., San Jose, CA (US)

(72) Inventors: Sen Lin, Albany, CA (US); Kun-Yung Chang, Los Altos Hills, CA (US); Austin H. Lesea, Los Gatos, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 15/346,474

(22) Filed: Nov. 8, 2016

(65) Prior Publication Data

US 2018/0129082 A1    May 10, 2018

(51) Int. Cl.
    *H04B 10/04*     (2006.01)
    *G02F 1/025*     (2006.01)
    *H04B 10/516*     (2013.01)
    *G02F 1/015*     (2006.01)

(52) U.S. Cl.
    CPC ........... *G02F 1/025* (2013.01); *H04B 10/516* (2013.01); *G02F 2001/0157* (2013.01); *G02F 2201/122* (2013.01); *G02F 2201/58* (2013.01)

(58) Field of Classification Search
CPC .. H04B 10/516; H04B 10/564; H04B 10/505; H04B 10/5055; H04B 10/548; H04B 10/5561; H04B 10/5057; H04B 10/572; G02F 1/01708; G02F 1/025; G02F 1/0121; G02F 1/0147
USPC ....... 398/183, 188, 187, 186, 189, 192, 193, 398/194, 195, 196, 197, 198, 135, 158, 398/159, 162, 33, 38, 136; 359/237, 245, 359/248, 279, 276, 247; 385/1, 2, 3, 8
See application file for complete search history.

(56) References Cited

U.S. PATENT DOCUMENTS

| | | | | |
|---|---|---|---|---|
| 5,798,856 | A * | 8/1998 | Suzuki ................ | G02F 1/0121 398/161 |
| 6,381,056 | B1* | 4/2002 | Ellis ................ | H04B 10/25077 398/183 |
| 7,734,191 | B1* | 6/2010 | Welch ................ | B82Y 20/00 398/158 |
| 9,726,914 | B2* | 8/2017 | Nakamura ........... | G02F 1/01708 |
| 2005/0249509 | A1* | 11/2005 | Nagarajan ............ | B82Y 20/00 398/198 |

OTHER PUBLICATIONS

Sun, Chen et al., "A 45 nm CMOS-SOI Monolithic Photonics Platform With Bit-Statistics-Based Resonant Microring Thermal Tuning," IEEE Journal of Solid-State Circuit (JSSC), Apr. 2016, vol. 51, Issue 4 pp. 893-907, IEEE, Piscataway, New Jersey, USA.

(Continued)

*Primary Examiner* — Hanh Phan
(74) *Attorney, Agent, or Firm* — W. Eric Webostad; Hong Shi

(57) ABSTRACT

Systems and methods therefor relating generally to electro-absorption modulation are disclosed. In a system thereof, a waveguide is for propagating an optical signal. A segmented electro-absorption modulator ("SEAM") includes: a segmented anode having at least two anode segments spaced apart from one another alongside a first side of the waveguide; and a segmented cathode having at least two cathode segments spaced apart from one another alongside a second side of the waveguide corresponding to the at least two anode segments.

20 Claims, 14 Drawing Sheets

(56) References Cited

OTHER PUBLICATIONS

Tektronix, "PAM4 Signaling in High Speed Serial Technology: Test, Analysis, and Debug," Oct. 2015, pp. 1-28, Tektronix, Santa Clara, California, USA.
Bakopoulos, Paraskevas et al., "120 Gb/s and 80 Gb/s PAM-4 Optical Interconnect with a Sub-Volt Driven EAM," Oct. 19, 2015, Asia Communications and Photonics Conference, The Optical Society (OSA), Washington, DC, USA.
Specification and drawings for U.S. Appl. No. 15/346,521, filed Nov. 8, 2016, Lin et al.

* cited by examiner

SEGMENTED ELECTRO-ABSORPTION MODULATION

TECHNICAL FIELD

The following description relates to integrated circuit devices ("ICs"). More particularly, the following description relates to segmented electro-absorption modulation for a photonic IC.

BACKGROUND

Conventionally, a digital-to-analog converter ("DAC") was used to generate amplitude levels for pulse amplitude modulation ("PAM") while compensating for nonlinearity of a conventional electro-absorption modulator ("EAM"). However, DACs in conventional EAM applications, in addition to consuming a significant amount of power, tend to have high-resolutions making them more expensive and more complex, especially for data rates in excess of 10 gigahertz.

SUMMARY

A system relates generally to electro-absorption modulation. In such a system, a waveguide is for propagating an optical signal. A segmented electro-absorption modulator includes: a segmented anode having at least two anode segments spaced apart from one another alongside a first side of the waveguide; and a segmented cathode having at least two cathode segments spaced apart from one another alongside a second side of the waveguide corresponding to the at least two anode segments.

A system relates generally to an electro-absorption modulation system. In such a system, a waveguide is for propagating an optical signal. A segmented electro-absorption modulator includes: a segmented anode having at least two anode segments located spaced apart from one another alongside a first side of the waveguide; and a non-segmented cathode located alongside a second side of the waveguide corresponding to the at least two anode segments.

A method relates generally to electro-absorption modulation. In such a method, an input optical signal is received by a waveguide. A modulation code is received corresponding to input data by a segmented electro-absorption modulator. The input optical signal passing through the waveguide is modulated segment-by-segment with the segmented electro-absorption modulator to generate an output optical signal.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 and 3-2 are respective block diagrams illustratively depicting end cross-sectional views of respective exemplary SEASs each having a SEAM.

FIGS. 5-1 through 5-4 are block diagrams of top-down cross-sectional views illustratively depicting respective exemplary SEAS's with a various configurations of an optional integrated heater.

FIG. 6-1 through 6-4 are block diagrams of top-down cross-sectional views illustratively depicting other exemplary SEAS's with an optional integrated heater.

FIGS. 10-1 through 10-3 are respective block diagrams illustratively depicting end cross-sectional views of respective exemplary SEASs each having a SEAM with an optional integrated heater.

FIGS. 11-1 and 11-2 are respective block diagrams of top-down cross-sectional views illustratively depicting respective exemplary SEASs each with an optional integrated heater such as for the SEAS of FIG. 10-3.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Conventional electro-absorption modulators have a waveguide with an anode electrode and a cathode electrode for applying an electric field in a direction perpendicular to a light beam passing through such waveguide. This electric field may be used to modulate such light beam to achieve a high extinction ratio, such as by using the quantum-confined Stark effect in a quantum well structure for example.

As described below in additional detail, a segmented electro-absorption modulator ("SEAM") itself is used to generate amplitude levels for an amplitude modulation, such as a form of PAM for example, without having to use a DAC. Each segment of a SEAM may have a same or a different length as another segment to compensate for non-linearity. Optionally, each segment or groups of segments may be individually thermally controlled to adjust for nonlinearity. Thus, length, as well as selection of, none or one or more segments of a SEAM may be used for a coarse nonlinearity tuning, while thermal control of none or one or more segments of such a SEAM may be used for fine nonlinearity tuning. With the above general understanding borne in mind, various configurations for a SEAM, as well as system and method for use of a SEAM, are generally described below.

Figure 1:
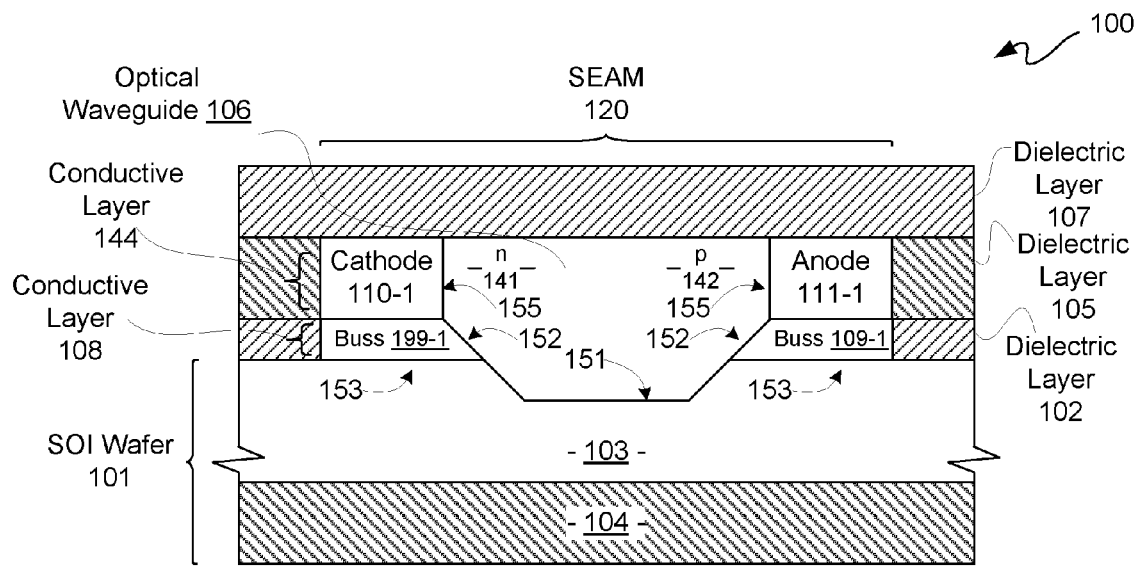
FIG. 1 is a block diagram illustratively depicting an end cross-sectional view of an exemplary segmented electro-absorption system ("SEAS") having a segmented electro-absorption modulator ("SEAM").

FIG. 1 is a block diagram illustratively depicting an end-on cross-sectional view of an exemplary segmented electro-absorption system ("SEAS") 100 having a segmented electro-absorption modulator ("SEAM") 120. SEAS 100 may include more than one SEAM 120, though only one SEAM 120 is illustratively depicted for purposes of clarity and not limitation.

SEAS 100 may include a semiconductor-on-insulator, such as a silicon-on-insulator ("SOI"), wafer or substrate 101 ("SOI wafer 101"). SOI wafer 101 may have an insulative layer 104, such formed with a silicon oxide or other insulator material, and a semiconductor-dielectric layer 103, such as formed with silicon or other semiconductor material, ("silicon layer 103"). Silicon layer 103 may be a single crystalline silicon layer.

A trench 151 may be formed in silicon layer 103 for forming an optical waveguide ("waveguide") 106 in and over trench 151. Along those lines, a doped silicon waveguide layer may be deposited and etched to form waveguide 106. Germanium or other optically active material may be added to such doped silicon waveguide layer, such as by growing GeSi or SiGe or other material with sufficient optical properties, for forming waveguide 106 in, over and above trench 151. Even though trench 151 has a semi-octagonal shape in end profile, other shapes may be used for trench 151 in other implementations.

Adjacent to lower sidewall surfaces 152 on both opposing sides (e.g., right and left sides) of waveguide 106 over an upper surface 153 of silicon layer 103 may be formed a conductive layer 108 to provide anode and cathode contacts respectively for signal busses 109-1 and 199-1. By "adjacent to", it is generally meant next to, in contact with, or sufficiently proximate to a waveguide to allow an electrical field applied to a segment of such a waveguide to affect an absorption coefficient for such segment for electro-absorption, namely by changing an absorption spectrum by applying an electric field. A dielectric layer 102 may be formed over upper surface 153 and patterned for defining locations for conductive layer 108 to provide signal busses 109-1 and 199-1, including contacts therefor. In the above or another implementation, a silicon layer 103 may be implanted, diffused and/or otherwise impregnated with same or different types of dopants for forming signal busses 109-1 and 199-1.

Another dielectric layer 105 may be formed over upper surfaces of dielectric layer 102 and contact layer 108. Dielectric layer 105 may be patterned for defining locations for cathodes and anodes. Along those lines, a cathodic-anodic conductive layer 144 may be deposited or otherwise formed to provide an anode segment 111-1 and a cathode segment 110-1 for bordering upper sidewall surfaces 155 respectively on opposing sides (e.g., right and left sides) of waveguide 106. Anode segment 111-1 may be formed over a contact for signal bus 109-1, and cathode segment 110-1 may be formed over a contact for signal bus 199-1.

A right side of waveguide 106 may be formed with and/or adjusted to have p-type acceptor impurities to provide a p-type region 142 in waveguide 106, and a left side of waveguide 106 may be formed with and/or adjusted to have n-type donor impurities to provide an n-type region 141 in waveguide 106. P-type region 142 may be adjacent to anode segment 111-1 and signal buss 109-1 and may extend inwardly from a right sidewall of waveguide 106 toward the center of waveguide 106. N-type region 141 may be adjacent to cathode segment 110-1 and signal buss 199-1 and may extend inwardly from a left sidewall of waveguide 106 toward the center of waveguide 106.

A dielectric layer 107 may be deposited over upper surfaces of conductive layer 144 and dielectric layer 105, as well as an upper surface of waveguide 106. Anode segment 111-1 and cathode segment 110-1 may provide a portion of a SEAM 120 for waveguide 106.

Figure 2:
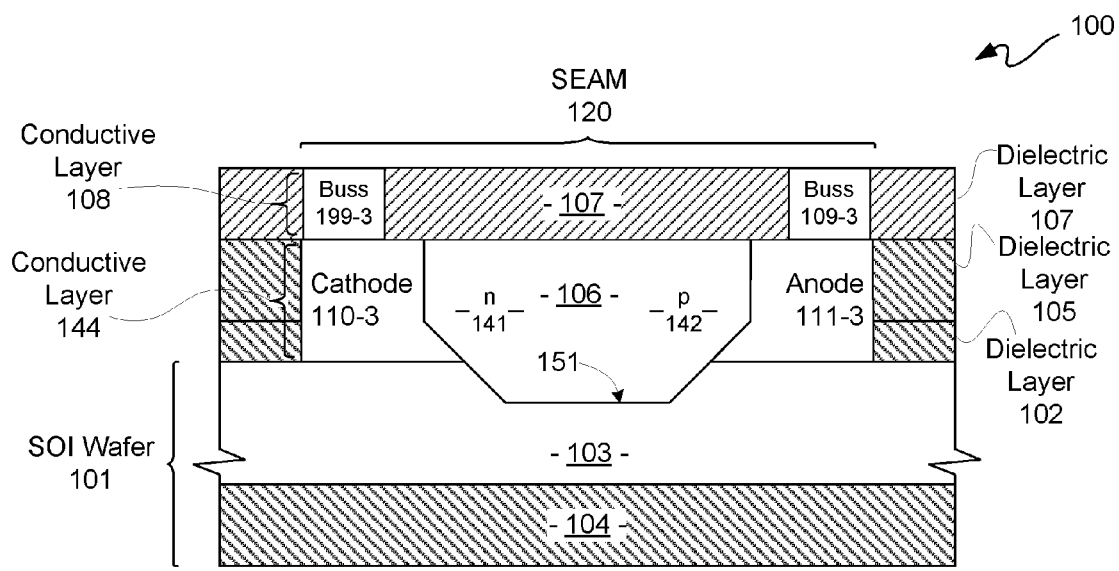
FIG. 2 is a block diagram illustratively depicting an end cross-sectional view of an exemplary SEAS having another SEAM.

FIG. 2 is a block diagram illustratively depicting an end-on cross-sectional view of another exemplary SEAS 100 having another SEAM 120. As many of the details of the description of FIG. 2 are the same as for FIG. 1, those same details are generally not repeated for purposes of clarity and not limitation.

In this implementation, a single dielectric layer 105 or a combination of dielectric layers 102 and 105 may be deposited, and vias may be formed in such one or more dielectric layers such as with one or more via etches. Assuming a single dielectric layer 105 is to include dielectric layer 102 for purposes of clarity and not limitation, dielectric layer 105 may be patterned for defining locations for cathodes and anodes. Via etching may be used to form vias in dielectric layer 105 alongside sidewall surfaces 152 and 155 of waveguide 106 for receipt of conductive material from deposition of conductive layer 144.

Along those lines, a cathodic-anodic conductive layer 144 may be deposited or otherwise formed to provide an anode segment 111-3 and a cathode segment 110-3 bordering sidewall surfaces 152 and 155 respectively on opposing sides (e.g., right and left sides) of waveguide 106. Anode segment 111-3 and cathode segment 110-3 may provide a portion of a SEAM 120 for waveguide 106.

A dielectric layer 107 may be deposited over upper surfaces of conductive layer 144 and dielectric layer 105, as well as an upper surface of waveguide 106. Dielectric layer 107 may be patterned for defining locations for conductive layer 108 to provide signal busses 109-3 and 199-3, including contacts therefor. Contacts for signal busses 109-3 and 199-3 may respectively be formed over anode segment 111-3 and cathode segment 110-3 with deposition of conductive layer 108.

Figures 1, 3:
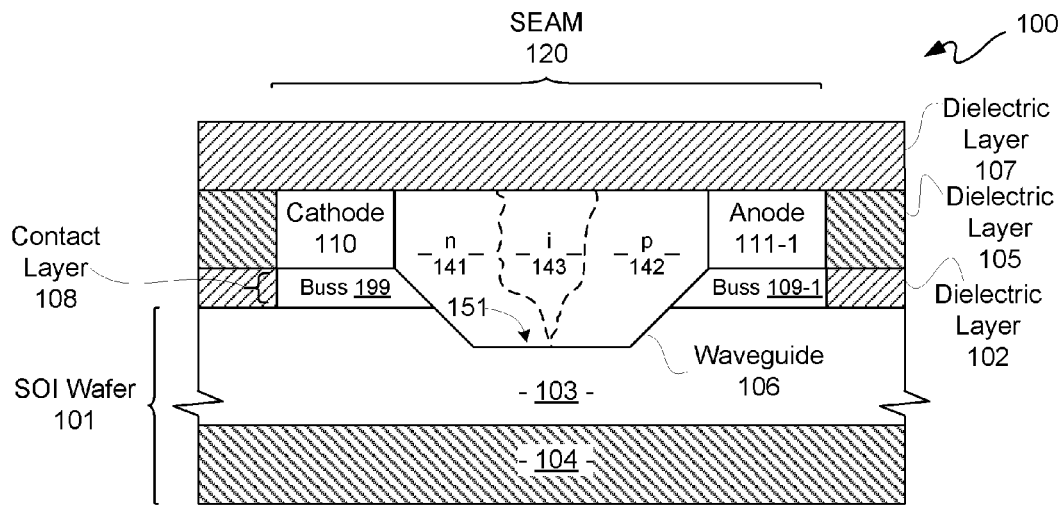
Figures 2, 3:
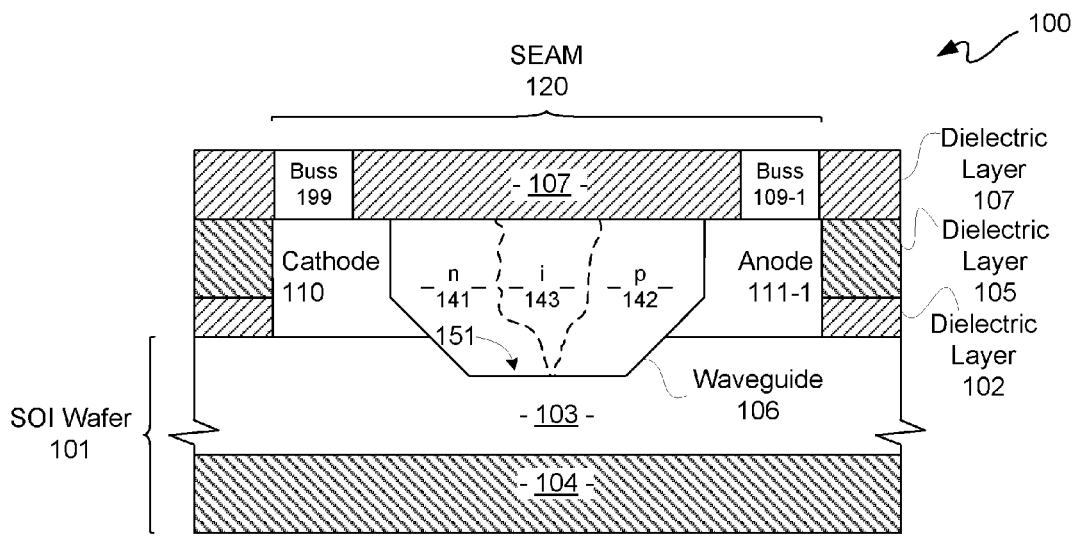

FIGS. 3-1 and 3-2 are respective block diagrams illustratively depicting end cross-sectional views of exemplary SEASs 100 each having a SEAM 120. FIGS. 3-1 and 3-2 respectively correspond to FIGS. 1 and 2, and so generally only the differences are described below for purposes of clarity and not limitation.

In these implementations, an intrinsic or undoped region ("i-region") 143 may be located between n-type region 141 and p-type region 142 in waveguide 106. It should be understood that borders between i-type region 143 and regions 141 and 142 may be vary.

Figure 4:
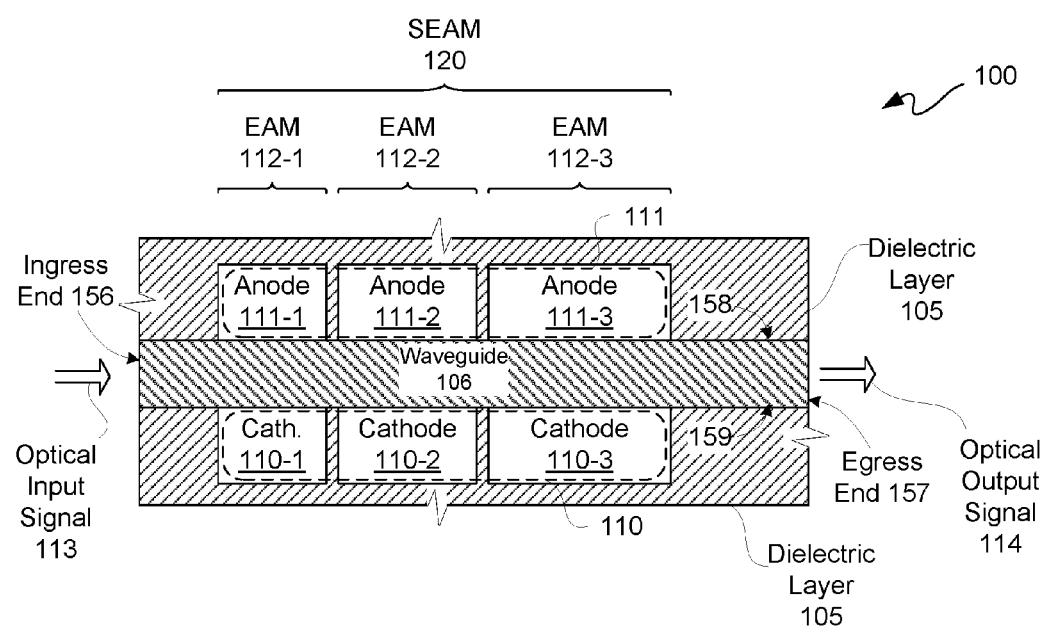
FIG. 4 is a block diagram of a top-down cross-sectional view illustratively depicting an exemplary SEAS.

FIG. 4 is a block diagram of a top-down cross-sectional view illustratively depicting an exemplary SEAS 100. Waveguide 106 may have an ingress end 156 configured for receiving an input optical signal 113 and an egress end 157 configured for outputting an output optical signal 114. SEAM 120 is a segmented SEAM 120 adjacent to waveguide 106. SEAM 120 includes a plurality of EAM segments, which in this example are EAM segments 112-1 through 112-3, adjacent to waveguide 106. Even though three EAM segments 112-1 through 112-3 are illustratively depicted, generally two or more EAM segments 112 may be implemented.

SEAM 120 may include a segmented anode 111 and a segmented cathode 110 respectively on opposite sidewalls of waveguide 106. Segmented anode 110 may have at least two anode segments located side-by-side lengthwise spaced apart from one another alongside a side 158 of waveguide 106, and segmented cathode 110 may have at least two cathode segments located side-by-side lengthwise spaced apart from one another alongside a side 159 of waveguide 106 opposite side 158. Anode segments 111-1 through 111-3 may be spaced across waveguide 106 from corresponding cathode segments 110-1 through 110-3 to form pairs to provide EAM segments 112-1 through 112-3, respectively. Generally, pairs of at least two anode segments 111 and at least two cathode segments 110 respectively aligned to one another for providing a series of at least two EAM segments 112 longitudinally alongside waveguide 106.

In this example, three EAM segments 112 are used for a pulse-amplitude modulation ("PAM") having four levels, namely PAM4 levels 0 to 3. However, in other implementations, other numbers of EAM segments 112 for other types of amplitude modulation may be used.

SEAM 120 may be readily used in many optical applications, such as optical links for example, where power consumption is important, as SEAM 120 is an energy-efficient device. For example, SEAM 120 may be used in optical backplanes. Moreover, SEAM 120 may be used in high-speed optical devices, such as optical transmitters and optical interconnects for example. Because SEAM 120 may modulate an optical signal (e.g., light) by electrically changing an absorption coefficient of an optically active material, such as a waveguide 106 formed of GeSi or other optically active material, SEAM 120 may compensate for nonlinearity in an electro-optical response, by having different segment lengths for example, which provides compensation for compatibility between optical and electrical PAM links or domains. Like conventional high-speed EAM modulators, SEAM 120 may be used with a non-return-to-zero ("NRZ") modulation.

In this example, length of EAM segment 112-1 is shorter than length of EAM segment 112-2, and length of EAM segment 112-2 is shorter than length of EAM segment 112-3. This progression from an input waveguide end 156 toward an output waveguide end 157 of longer and longer longitudinal lengths of anode and cathode segment pairs may be used to compensate for nonlinearity of each successive electro-optical response. Thus, by having EAM segments 112-1 through 112-3 vary in length, amplitude levels may become more distinct, namely more closely represent linear steps. SEAMs 120 may be formed for parallel optical signal processing on an SOI wafer 101 with each SEAM 120 having same or different nonlinearity compensation depending on application, such as for same or different types of modulation.

Again, it should be understood that SEAM 120 may be used without a high-speed electrical DAC, such as a modulator driver, to compensate for nonlinearity. Thus, for low-power applications, design challenges associated with designing a low-power high-speed DAC with high resolution may be avoided by using a SEAM 120. Moreover, by using a SEAM 120, design challenges of adaptively adjusting DAC codes to maintain a balanced PAM4 eye diagram may be avoided.

While same or different lengths of EAM segments 112 may be used for coarse nonlinearity compensation, thermal compensation may additionally be used with such same different lengths for fine nonlinearity adjustment. Thus, the amount of light allowed to pass as optical input signal 113 to optical output signal 114, namely the amount of light absorbed by electro-absorption, may be controlled by activating 0, 1, 2, or 3 of EAM segments 112-1 through 112-3. In this example, EAM segments 112-1 through 112-3 have different lengths for thermometer coding, with none, or one or more of EAM segments 112-1 through 112-3 being active at a time. However, in another implementation, a different type of coding, such as binary coding for example, may be used. Moreover, in another implementation, none or only one EAM segment 112 may be active at a time. Accordingly, it should be understood that many configurations may be implemented depending upon modulation and/or coding used.

Figures 1, 5:
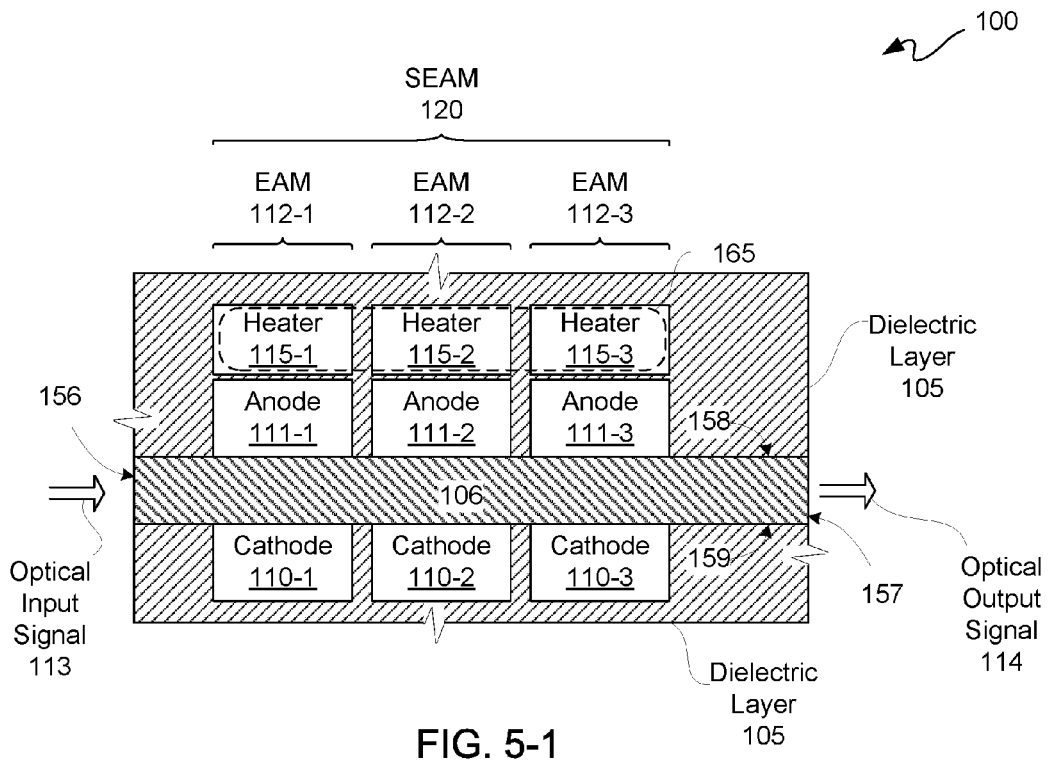
Figures 2, 5:
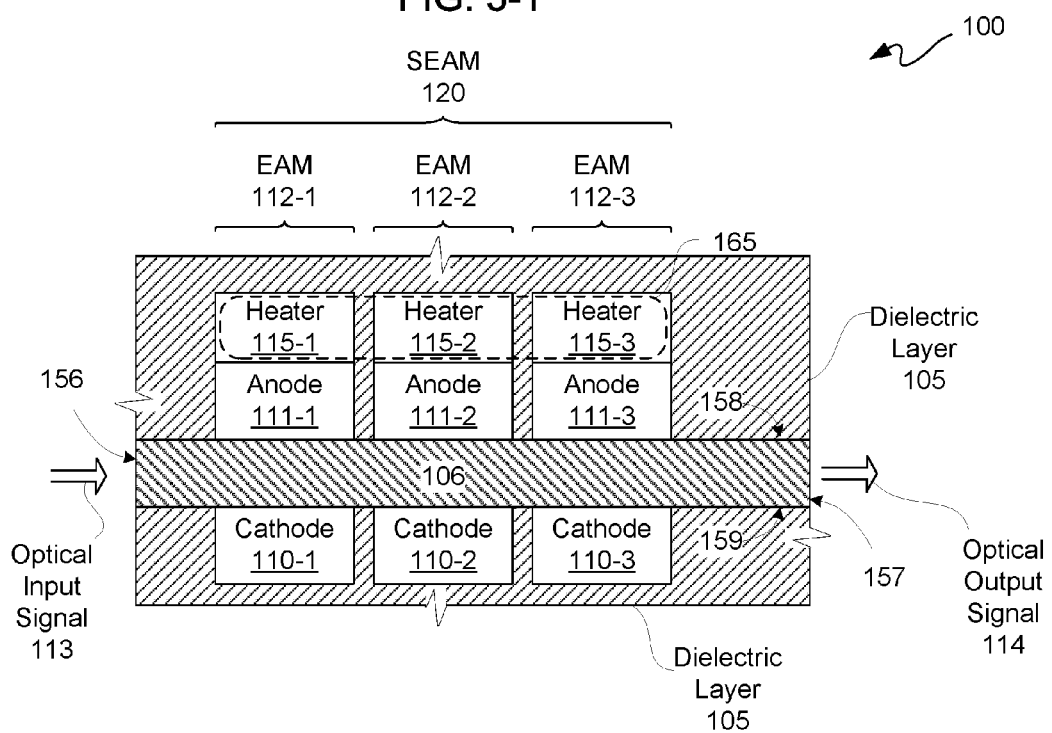
Figures 3, 5:
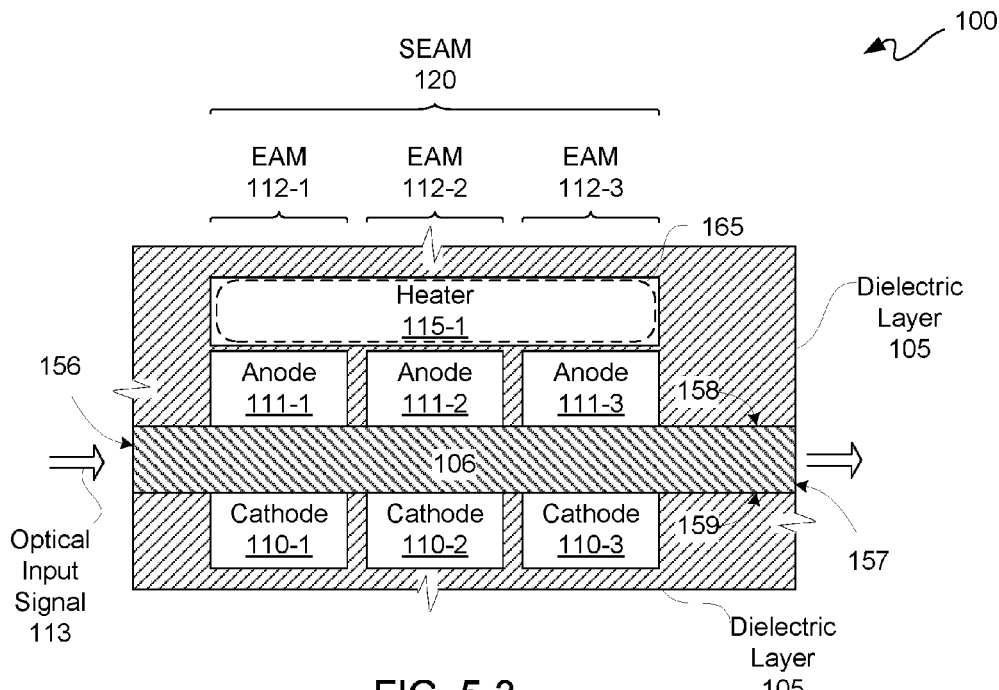
Figures 4, 5:
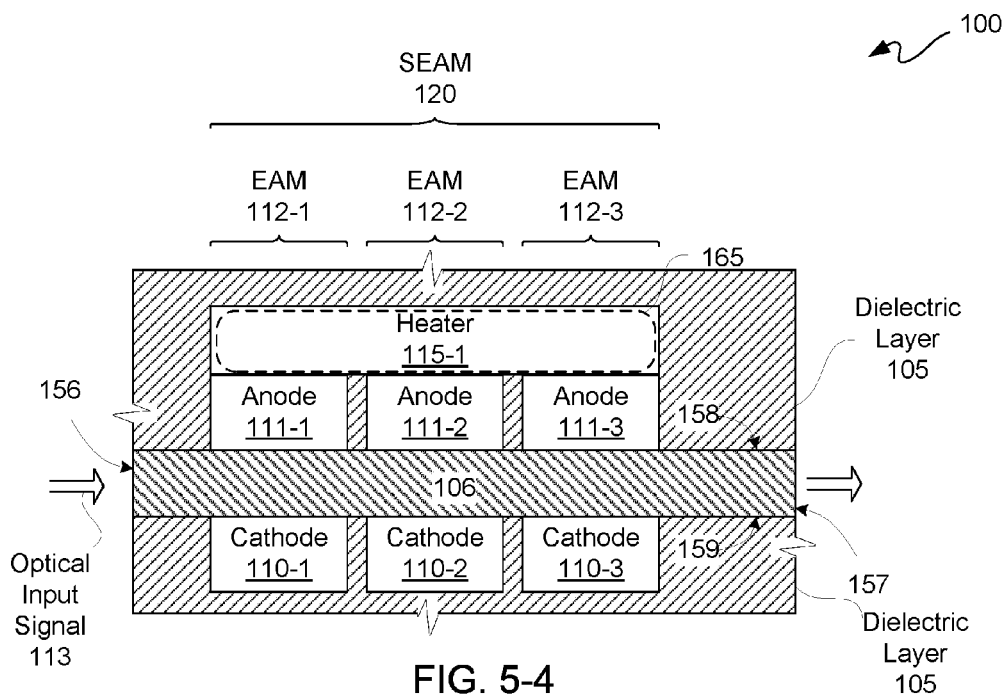

FIG. 5-1 is a block diagram of a top-down cross-sectional view illustratively depicting an exemplary SEAS 100 with an optional integrated heater 165. FIG. 5-1 is the same as FIG. 4, except for the addition of optional integrated heater 165, and so same description is not repeated for purposes of clarity and not limitation. Integrated heater 165 has at least two heater segments 115 located side-by-side lengthwise spaced apart from one another alongside and corresponding to at least two anode segments 111.

In this example, anode segments 111-1 through 111-3, cathode segments 110-1 through 110-3, and heater segments 115-1 through 115-3 may respectively be aligned to one another for providing a series of EAM segments 112-1 through 112-3. Again, even though a series of EAM segments 112-1 through 112-3 is illustratively depicted for a PAM4 implementation, in another implementation there may be at least two EAM segments 112. In this example, heater segments 115-1 through 115-3 are spaced apart from anode segments 111-1 through 111-3, respectively, where anode segments 111-1 through 111-3 are located between a side 158 of waveguide 106 and heater segments 115-1 through 115-3. Moreover, in this example, EAM segments 112 all have same lengths along waveguide 106.

FIG. 5-2 is a block diagram of a top-down cross-sectional view illustratively depicting an exemplary SEAS 100 with an optional integrated heater 165. FIG. 5-2 is the same as FIG. 5-1, except for optional integrated heater 165 is in contact with segmented anode 111, and so same description is not repeated for purposes of clarity and not limitation. In this example, anode segments 111-1 through 111-3 are respectively in contact with heater segments 115-1 through 115-3, where anode segments 111-1 through 111-3 are located between a side 158 of waveguide 106 and heater segments 115-1 through 115-3.

Even though heater segments 115-1 through 115-3 are located on an anode-side of waveguide 106, in another implementation heater segments 115-1 through 115-3 may be located on a cathode-side of waveguide 106 corresponding to cathode segments 110-1 through 110-3. In other words, an integrated heater 165 may have at least two heater segments 115 located side-by-side lengthwise spaced apart from one another, which integrated heater segments 115 may border or be spaced apart from at least two corresponding cathode segments along sides thereof. Again, such anode, cathode and heater segments may be respectively aligned to one another for providing a series of at least two electro-absorption modulation segments, such as EAM segments 112-1 through 112-3.

FIG. 5-3 is a block diagram of a top-down cross-sectional view illustratively depicting an exemplary SEAS 100 with an optional integrated heater 165. FIG. 5-3 is the same as FIG. 5-1, except for optional integrated heater 165 is has only one heater segment 115-1, namely an integrated non-lengthwise segmented heating element, and so same description is not repeated for purposes of clarity and not limitation. Integrated heater 165 in this example has one continuous heater segment 115-1 located alongside and spaced apart from at least two anode segments.

In this example, anode segments 111-1 through 111-3 and cathode segments 110-1 through 110-3 may respectively be aligned to one another, and one single heater segment 115-1 of integrated heater 165 may span all three anode segments for providing a series of EAM segments 112-1 through 112-3. In this example, integrated heater 165 is spaced apart from sides of anode segments 111-1 through 111-3, respectively, where anode segments 111-1 through 111-3 are located between a side 158 of waveguide 106 and integrated heater 165.

FIG. 5-4 is a block diagram of a top-down cross-sectional view illustratively depicting an exemplary SEAS 100 with an optional integrated heater 165. FIG. 5-4 is the same as FIG. 5-3, except for optional integrated heater 165 is in contact with anode segments 111, and so same description is not repeated for purposes of clarity and not limitation.

Even though a heater segment 115-1 of integrated heater 165 is located on an anode-side of waveguide 106, in another implementation integrated heater 165 may be located on a cathode-side of waveguide 106 proximate to or in contact with cathode segments 110-1 through 110-3. In other words, a heater segment 115-1 of integrated heater 165 may be located lengthwise spaced apart from or in contact with sides of at least two cathode segments. In an application where compensation for nonlinearity with respect to EAM segments 112 is sufficient exception for environmental temperature differences affecting each of such EAM segments 112, a less granular thermal adjustment of EAM segments 112 may be implemented, namely less granular than independently adjusting temperature of each EAM segment 112, and thus a single heater segment 115-1 may be used.

Figures 1, 6:
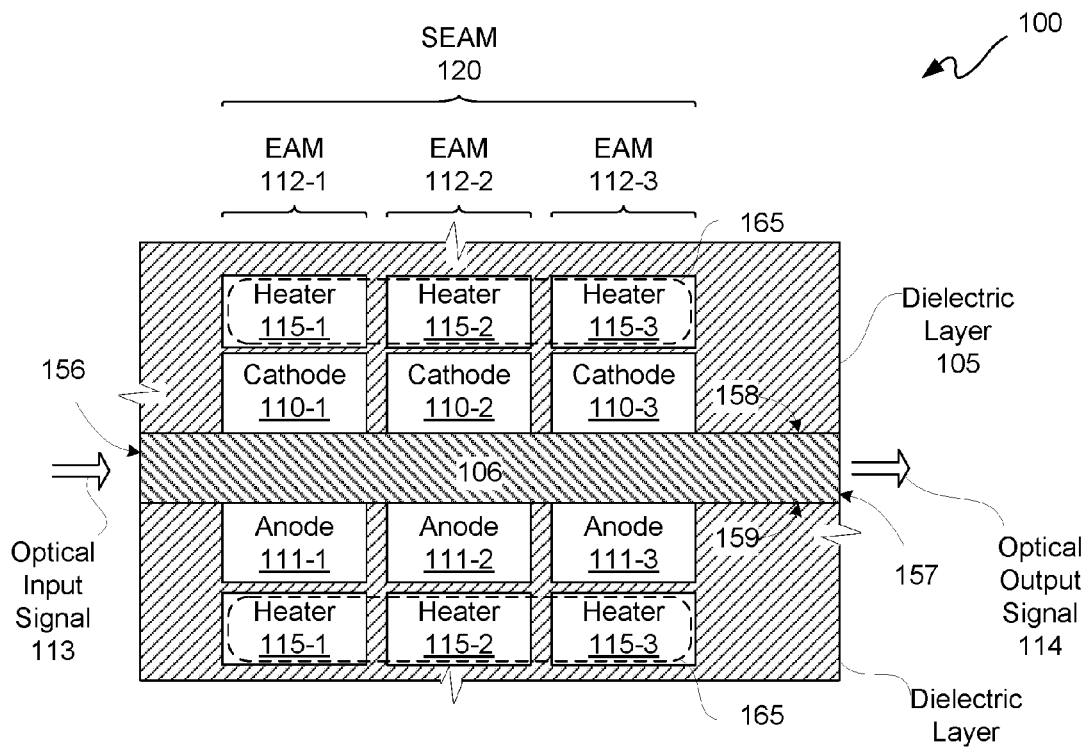
Figures 2, 6:
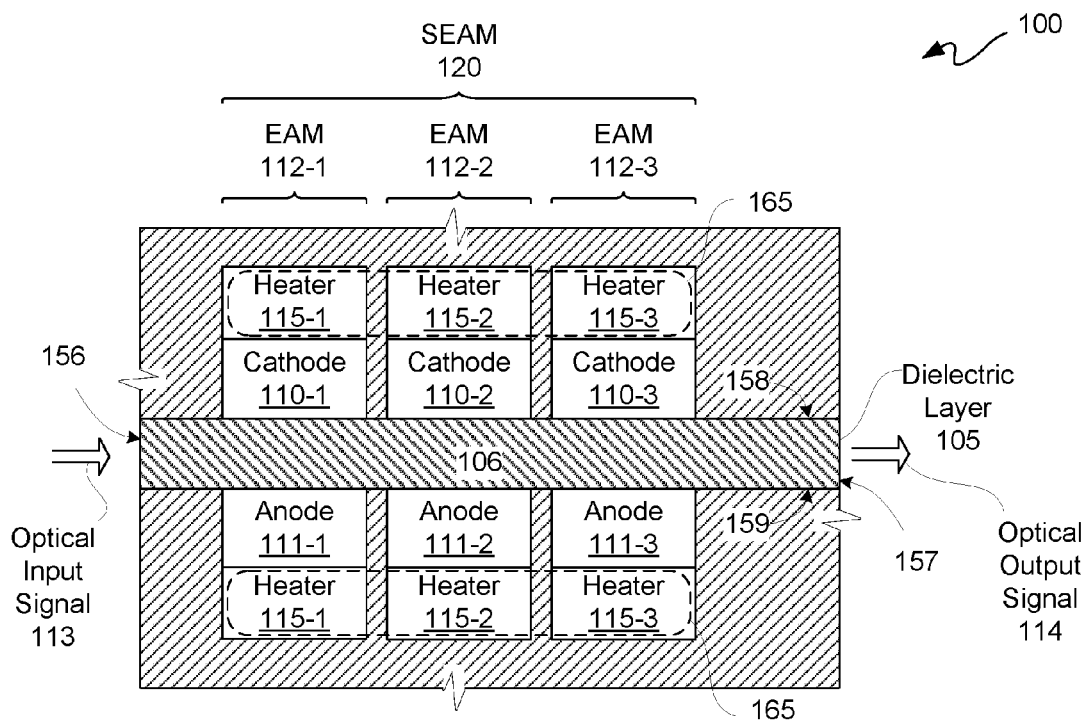
Figures 3, 6:
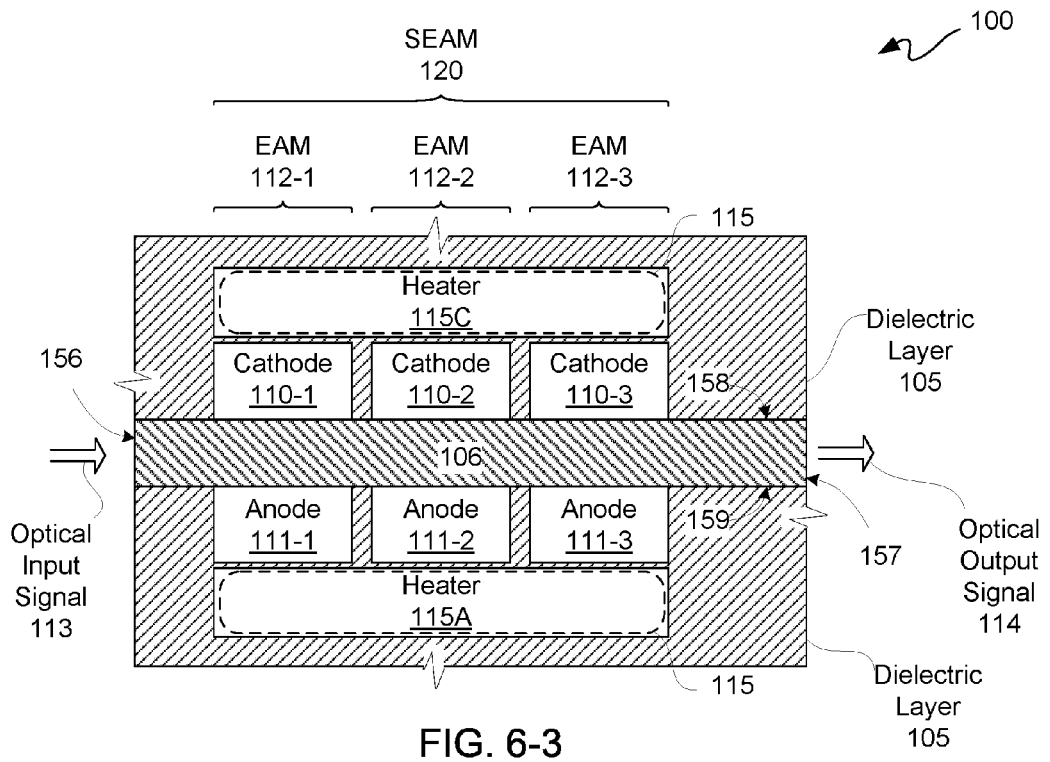
Figures 4, 6:
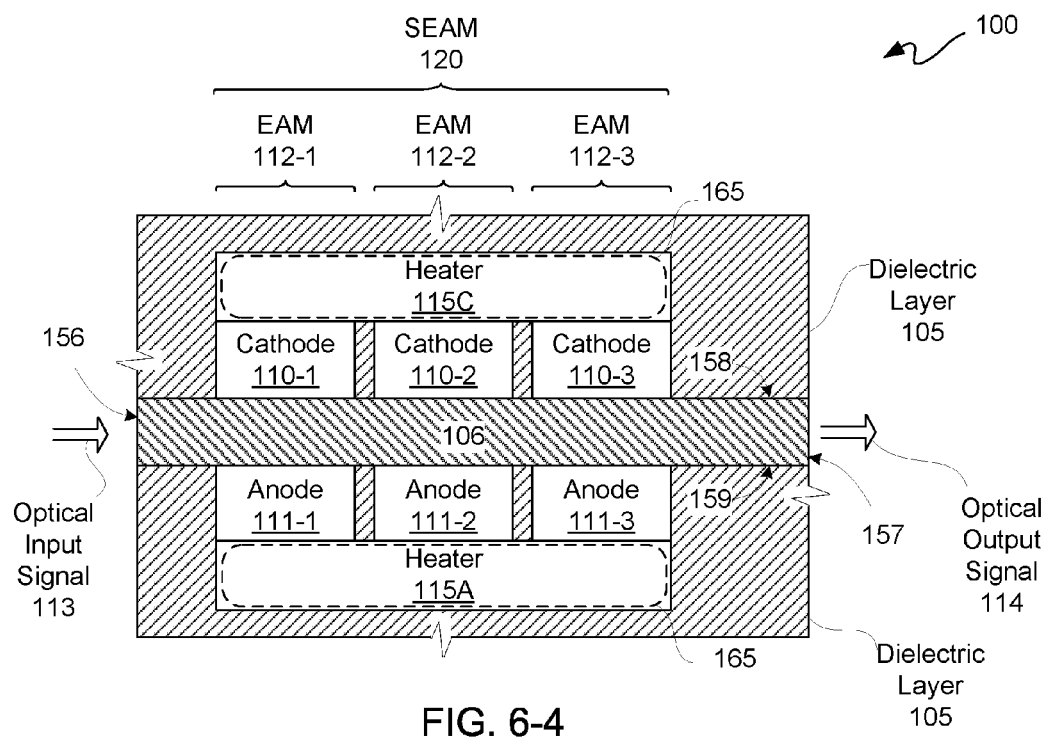

FIG. 6-1 is a block diagram of a top-down cross-sectional view illustratively depicting an exemplary SEAS 100 with an optional integrated heater 165. FIG. 6-1 is the same as FIG. 5-1, except for optional integrated heater 165 also on a cathode-side, and so same description is not repeated for purposes of clarity and not limitation.

Integrated heater 165 has at least two heater segments located side-by-side lengthwise spaced apart from one another alongside and corresponding to at least two anode and cathode segment pairs. In this example, anode segments 111-1 through 111-3 are respectively spaced apart from sides of heater segments 115-1 through 115-3, where anode segments 111-1 through 111-3 are located between a side 158 of waveguide 106 and heater segments 115-1 through 115-3. Moreover, heater segments 115-1 through 115-3 are spaced apart from sides of cathode segments 110-1 through 110-3, respectively, where cathode segments 110-1 through 110-3 are located between a side 159 of waveguide 106 and cathode-side heater segments 115-1 through 115-3.

In this example, anode-side and cathode-side heater segments 115-1 through 115-3 may be commonly controlled. For example, a heater segment 115-1, which may have both an anode-side and a cathode-side portion, may be independently controlled from heater segments 115-2 and 115-3. Moreover, in another implementation, an anode-side heater segment 115-1 may be independently controlled from a cathode-side heater segment 115-1, as well as independently controlled from other heater segments. Generally, an integrated heater 165 may have heater segments 115 located lengthwise alongside at least two anode segments 111-1 through 111-3 and/or at least two cathode segments 110-1 through 110-3 with or without contact thereof. Moreover, an integrated heater 165 may have at least two heater segments 115 located side-by-side one another with intervening dielectric gaps therebetween corresponding to at least two anode segments 111-1 through 111-3 or at least two cathode segments 110-1 through 110-3.

FIG. 6-2 is a block diagram of a top-down cross-sectional view illustratively depicting another exemplary SEAS 100 with an optional integrated heater 165. FIG. 6-2 is the same as FIG. 6-1, except for optional integrated heater 165 having heater segments 115-1 through 115-3 on both a cathode-side and an anode-side respectively in contact with cathode segments 110-1 through 110-3 and anode segments 111-1 through 111-3, and so same description is not repeated for purposes of clarity and not limitation. Thus, anode-side heater segments 115-1 through 115-3 are located side-by-side lengthwise spaced apart from one another and in contact with corresponding anode segments 111-1 through 111-3 along sides thereof, respectively, and cathode-side heater segments 115-1 through 115-3 are located side-by-side lengthwise spaced apart from one another and in contact with corresponding cathode segments 110-1 through 110-3 along sides thereof, respectively.

FIG. 6-3 is a block diagram of a top-down cross-sectional view illustratively depicting an exemplary SEAS 100 with an optional integrated heater 165. FIG. 6-3 is the same as FIG. 5-3, except for optional integrated heater 165 has a heating element on an anode-side and another heating element on a cathode-side each respectively spaced apart from anode and cathode segments, and so same description is not repeated for purposes of clarity and not limitation.

Integrated heater 165 has an anode-side continuous heater segment 115A located alongside and spaced apart from at least two anode segments, such as anode segments 111-1 through 111-3 for example, and has a cathode-side continuous heater segment 115C located alongside and spaced apart from at least two cathode segments, such as cathode segments 110-1 through 110-3 for example. In this example, anode segments 111-1 through 111-3 and cathode segments 110-1 through 110-3 may respectively be aligned to one another, and an anode-side heater segment 115A and a cathode-side heater segment 115C of integrated heater 165 may span all three anode and cathode segments, respectively, for providing a series of EAM segments 112-1 through 112-3. In this example, anode-side heater segment 115A is spaced apart from sides of anode segments 111-1 through 111-3, respectively, where anode segments 111-1 through 111-3 are located between a side 158 of waveguide 106 and anode-side heater segment 115A. Furthermore, in this example, cathode-side heater segment 115C is spaced apart from sides of cathode segments 110-1 through 110-3, respectively, where cathode segments 110-1 through 110-3 are located between a side 159 of waveguide 106 and cathode-side heater segment 115C.

FIG. 6-4 is a block diagram of a top-down cross-sectional view illustratively depicting an exemplary SEAS 100 with an optional integrated heater 165. FIG. 6-4 is the same as FIG. 6-3, except for optional integrated heater 165 has a heating element on an anode-side and another heating element on a cathode-side each respectively in contact with anode and cathode segments, and so same description is not repeated for purposes of clarity and not limitation. Anode-side heater segment 115A is located alongside and in contact with corresponding anode segments 111-1 through 111-3, respectively, and cathode-side heater segment 115C is located alongside and in contact with corresponding cathode segments 110-1 through 110-3.

In the example implementations of FIGS. 6-3 and 6-4, anode-side continuous heater segment 115A and cathode-side continuous heater segment 115C are commonly controlled. However, in another implementation, anode-side continuous heater segment 115A and cathode-side continuous heater segment 115C may be independently controlled.

For purposes of clarity by way of example and not limitation, it shall be assumed that a base configuration as illustratively depicted in FIG. 4 with corresponding integrated heater elements or segments 115 as in FIG. 5-1 is used in the following examples; however, it should be understood that any of the above examples, or combinations thereof, may be used in accordance with the following description. Moreover, it should be understood that multiple waveguides 106, and corresponding SEAMs 120, may be formed on an SOI wafer 101, even though only one is illustratively depicted for purposes of clarity.

Figure 7:
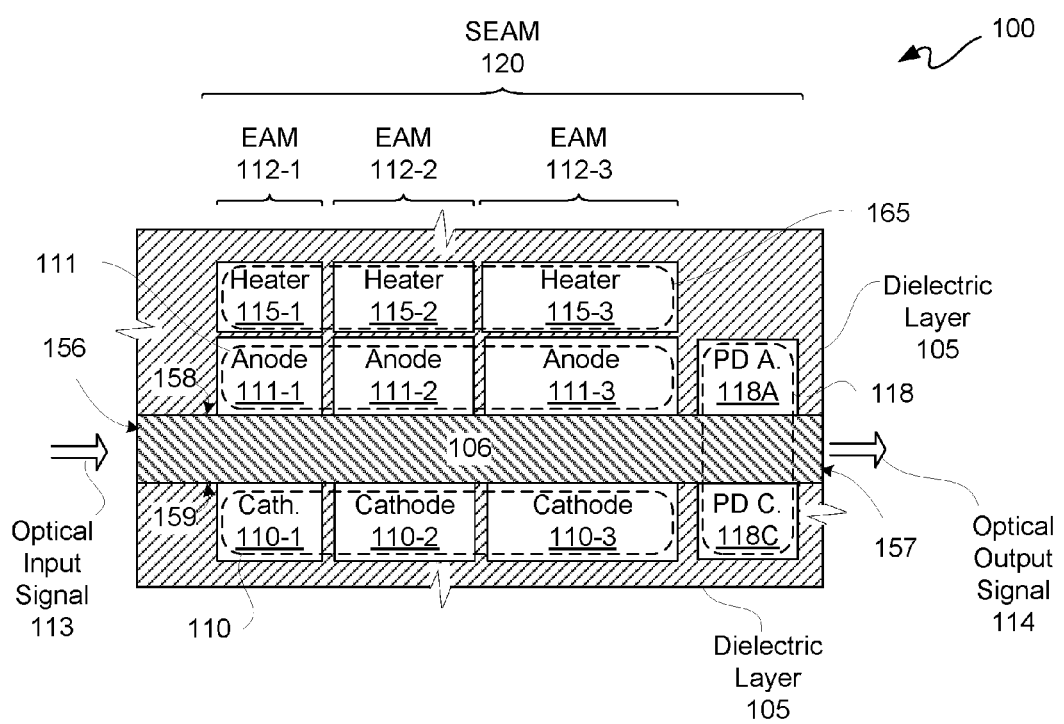
FIG. 7 is a block diagram of a top-down cross-sectional view illustratively depicting an exemplary SEAS with an optional integrated heater and a photo detector.

FIG. 7 is a block diagram of a top-down cross-sectional view illustratively depicting an exemplary SEAS 100 with an optional integrated heater 165. Even though EAM segments 112-1 through 112-3 have different lengths longitudinally alongside waveguide 106 as illustratively depicted, in another implementation lengths of two or more of EAM segments may be the same as one another longitudinally alongside waveguide 106. Longitudinal lengths may be different for different levels of electro-optical absorption, namely segmentally changing an absorption coefficient along waveguide 106 material. For example, EAM segments 112-1 through 112-3 may be configured with same or different lengths longitudinally alongside waveguide 106 corresponding to a thermometer code for an incremental progression of absorption states. However, in another example, EAM segments 112-1 through 112-3 be configured to have generally same or different lengths longitudinally alongside waveguide 106 corresponding to a binary code for a binary progression of absorption states.

In this implementation, a photodetector 118 is located proximate to egress end 157 and forms part of SEAM 120. Photodetector 118 may include a detector anode 118A located alongside side 158 of waveguide 106 and a detector cathode 118C located alongside side 159 of waveguide 106. Detector anode 118A and detector cathode 118C may be aligned to one another on opposing sides of waveguide 106 and adjacent to sides 158 and 159, respectively. Detector anode 118A and detector cathode 118C may be formed along with anode segments 111 and cathode segments 110, as the same material may be used for all of these anodes and cathodes.

Detector anode 118A and detector cathode 118C may be spaced apart from a last stage, namely an nth stage, anode segment 111-n and a last stage cathode segment 110-n, respectively, of a series of n EAM segments 112-1 through 112-n. Photodetector 118 may be configured to provide a photocurrent signal proportional to detected intensity of output optical signal 114 for association with a data eye of such output optical signal 114. Anode segments 111-1 through 111-3 may collectively form a segmented anode 111 of an SEAM 120, and cathode segments 110-1 through 110-3 may collectively form a segmented cathode 110. However, a cathode may be non-segmented, namely a unitary cathode segment 110, for being paired with a segmented anode 111. Along those lines, this has to do with having a segmented or non-segmented cathode 110 being commonly grounded or otherwise commonly coupled, whereas anode segments of a segmented anode 111 are electrically separated from one another.

Figure 8:
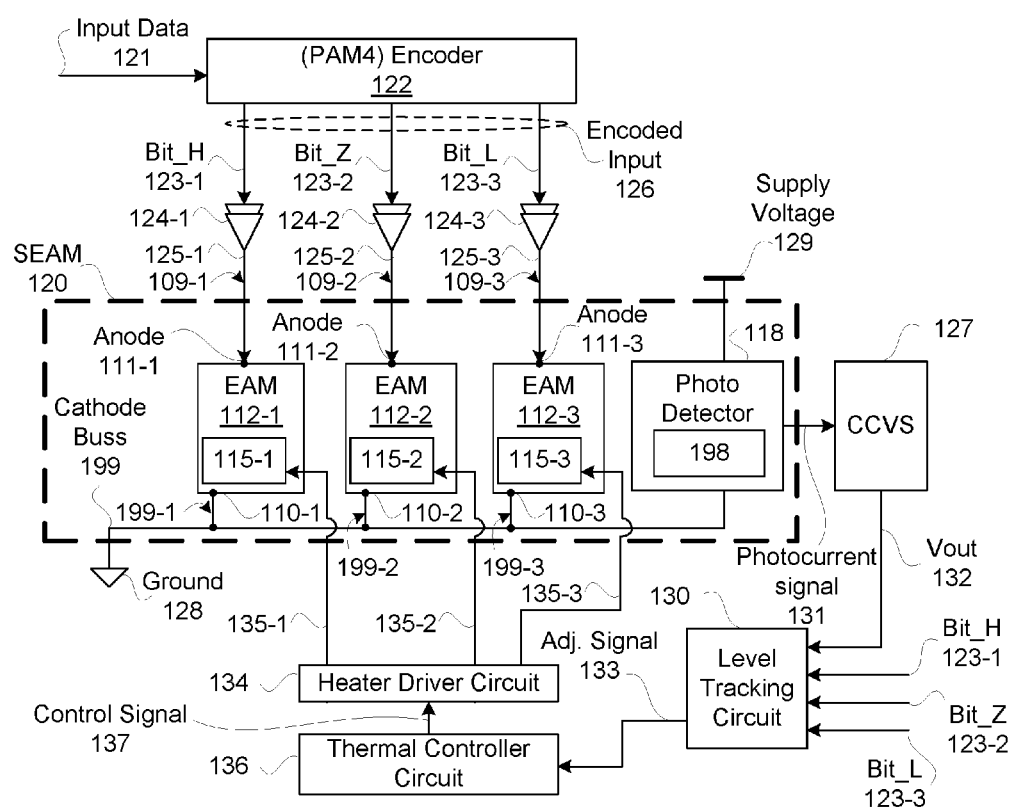
FIG. 8 is a schematic diagram illustratively depicting an exemplary SEAS for a transmitter for an electrical domain.

FIG. 8 is a schematic diagram illustratively depicting an exemplary SEAS 100 for a transmitter for an electrical domain. FIG. 8 is further described with simultaneous reference to FIGS. 1 through 8.

Input data 121 is provided to an encoder 122. In this example, encoder 122 is a PAM4 encoder; however, in another implementation another type of modulation, including without limitation another type of PAM, may be used to encode input data 121 with an encoder. In this example for PAM4, a "high" bit ("Bit_H") drive signal 123-1, a "zero" bit ("Bit_Z") drive signal 123-2, a "low" bit ("Bit_L") drive signal 123-3, or a combination of these drive signals may be active at a time or none of these drive signals may be active at a time in response to output from encoder 122, which output is responsive to input data 121.

In PAM4, four distinct pulse amplitude levels or pulse amplitudes, generally amplitude levels 1, 2, 3, and 4, are represented by two bits each, such as for example 00, 01, 11, and 10 for a Gray code implementation. Each pair of PAM4 bits is called a "symbol", namely two bits per symbol. When one of such four amplitude levels is transmitted in a symbol period, two bits are transmitted in parallel. For a PAM4 data stream with 2-bits per symbol, each two bits of input data 121 may be encoded into a 3-bit thermometer code for this example. Table I below is an example a modulation code that may be used for encoding of input data 121 for this implementation, namely for mapping 2-bit PAM4 symbols of input data 121 into corresponding 3-bit thermometer drive signals represented with states of bits of drive signals 123-1 through 123-3.

TABLE I

| PAM4 input data 121 | Bit_H | Bit_Z | Bit_L |
|---|---|---|---|
| 11 | 1 | 1 | 1 |
| 10 | 0 | 1 | 1 |
| 01 | 0 | 0 | 1 |
| 00 | 0 | 0 | 0 |

In this example, an encoded input 126 to SEAM 120 as output from encoder 122 has a greatest amount of controlled electro-optical absorption responsive to a PAM4 11 symbol input of input data 121 resulting in all of bits of drive signals 123-1 through 123-3 being asserted, namely in this example all logic 1s. In this example, an encoded input 126 to SEAM 120 as output from encoder 122 has a least amount of absorption responsive to a PAM4 00 symbol input of input data 121 resulting in none of bits of drive signals 123-1 through 123-3 being asserted, namely in this example all logic 0s. In this example, an encoded input 126 to SEAM 120 as output from encoder 122 has a second to least amount of absorption responsive to a PAM4 01 symbol input of input data 121 resulting in none of bits of drive signals 123-1 and 123-2 being asserted, namely in this example both logic 0s, and a bit of drive signal 123-3 being asserted, namely in this example a logic 1. In this example, an encoded input 126 to SEAM 120 as output from encoder 122 has a second most amount of absorption responsive to a PAM4 10 symbol input of input data 121 resulting in both of bits of drive signals 123-2 and 123-3 being asserted, namely in this example both logic 1s, and a bit of drive signal 123-1 not being asserted, namely in this example a logic 0. However, any encoding may be used, including without limitation a complete reversal of the encoding of Table I, a Gray code version of Table I, or another combination. Generally, various steps in light may be controlled by electro-absorption to provide detectable amplitude levels, whether thermometer, binary, or otherwise encoded.

Therefore, for purposes of clarity by way of example and not limitation, it shall be assumed that the encoding of Table I is used. Moreover, even though a 100% duty cycle is assumed for processing input data 121 for modulating an optical input signal 113, such as a carrier signal for example, responsive to such input data 121 provided as encoded input 126 to SEAM 120, in another implementation less than a 100% duty cycle may be used, namely with null periods between symbol periods. Along those lines, for this implementation, a null period or interval may be used between data bursts, and so all of bits of drive signals 123 may be held at logic 0s for such null periods or intervals.

In this exemplary implementation, three drive signals 123 drive EAM segments 112-1 through 112-3, respectively. A ratio between EAM segments 112-1 through 112-3 may be selected such that nonlinearity in an electro-optical response can be compensated for in a PAM4 eye. In this example, each EAM segment 112-1 through 112-3 is driven by a corresponding NRZ voltage-mode driver 124-1 through 124-3, which are respectively coupled to receive drive signals 123-1 through 123-3. Implementation of NRZ voltage mode drivers 124-1 through 124-3 is significantly less complex and uses less power than a high-speed DAC.

NRZ voltage outputs 125-1 through 125-3 respectively of NRZ voltage mode drivers 124-1 through 124-3 responsive to corresponding drive signals 123-1 through 123-3 may provide NRZ voltages to anode segments 111-1 through 111-3, respectively. Thus, anode segments 111-1 through 111-3 respectively of EAM segments 112-1 through 112-3 may receive a corresponding NRZ voltage of NRZ voltage outputs 125-1 through 125-3 via anode signal busses 109-1 through 109-3, respectively. Though NRZ voltages are used, other types of voltages may be used, such as a non-NRZ voltage or an inverted NRZ ("NRZI") voltage for example.

NRZ voltages may respectively be applied to anodes 111-1 through 111-3 for conducting respective electric fields to corresponding cathode segments 110-1 through 110-3 through corresponding portions of waveguide 106. At least two anode segments 111 may be respectively electrically coupled to separate source nodes, such as output nodes of NRZ voltage mode drivers 124-1 through 124-3 respectively. This may be used for selectively applying voltages to such to anode segments 111-1 through 111-3, respectively, from NRZ voltage mode drivers 124-1 through 124-3. Any and all asserted bits of an encoded input 126 may be used to modulate input optical signal 113 by electro-optical modulation thereof to provide a modulated output optical signal 114, where such modulation effectively represents a modulation code of an encoded input 126.

Cathode segments 110-1 through 110-3 respectively corresponding to anode segments 111-1 through 111-3 may all be coupled to a common ground 128 through corresponding cathode signal busses 199-1 through 199-3. Cathode signal busses 199-1 through 199-3 may be a common cathode buss 199 coupled to ground 128. Thus, in another implementation, rather than cathode segments 110-1 through 110-3, a single non-segmented cathode 110 may be used for having corresponding surface areas facing surface areas of anode segments 111-1 through 111-3 across waveguide 106.

After being modulated, if at all, by SEAM 120, optical input signal 113 may pass through waveguide 106 proximate to photodetector 118, namely between photodetector anode 118A and cathode 118C, of SEAM 120. Photodetector 118 may include a photodiode circuit 198 having a photodiode, where such photodetector circuit 198 may be conventional, and thus is not described in unnecessary detail for purposes of clarity and not limitation. For adaptive thermal tuning in this example, a photodiode for PAM4 level detection may be implemented near a bus egress end 157 of waveguide 106, namely along waveguide 106 after SEAM 120.

Photodetector 118, which may be biased between a photodetector supply voltage 129 and ground 128, may output a photocurrent signal 131 responsive to detected photons, namely detected intensity, of optical output signal 114 passing through. In an implementation, optical input signal 113 may be a laser beam, such as from a laser diode for example, and EAS 100 may be in a photonic integrated circuit. Photocurrent signal 131 output from photodetector 118 may represent a data eye of optical output signal 114 associated with a PAM thereof, which in this example generally is a data eye having four distinct pulse amplitude levels. However, in another implementation, such data eye may have fewer or more than four distinct pulse amplitude levels.

A current-controlled voltage source ("CCVS") 127 may be configured to receive photocurrent signal 131 to provide an output voltage signal ("Vout") 132. CCVS 127 may be a circuit implemented for example with a transimpedance amplifier ("TIA"). A level tracking circuit 130 may be configured to receive output voltage signal 132 to provide an eye opening adjustment signal 133. Level tracking circuit 130 may be configured for optical modulation amplitude ("OMA") tracking in order to know what modulating states to look for in an eye opening of an optical output signal 114, level tracking circuit 130 may be configured to receive drive signals 123-1 through 123-3. Level tracking circuit 130 may be configured responsive to states of drive signals 123-1 through 123-3 and a corresponding output voltage signal 132 to determine whether linearity of an eye opening with respect to any one or more amplitude levels thereof is to be adjusted to enhance any one or more corresponding amplitude level's linearity.

A thermal controller 136 may be configured to receive eye opening adjustment signal 133 to provide a thermal control signal 137. Thermal control signal 137 may be an N-bit coded signal. A heater driver 134 may be configured to receive thermal control signal 137 to assert none or one or more of heater activation signals 135-1 through 135-3 respectively to heater segments 115-1 through 115-3.

Absorption curves of EAM segments 112-1 through 112-3 for waveguide 106 each have a temperature dependent variable component. Along those lines, in this example three separate heater segments 115-1 through 115-3, which may be thought of as heating elements, are driven by heater driver circuit 134 of an integrated heater 165. In this example, it shall be assumed that heater segments 115-1 through 115-3 include both anode-side heating elements and cathode-side heating elements corresponding to one another. Although heater segments 115-1 through 115-3 are commonly coupled to heater driver 134, each anode-side and cathode-side heating element may be separately controlled. However, in another implementation, pairs of anode-cathode-side of heating elements may not be commonly coupled to receive a corresponding heater activation signal but may be independently controlled with respect to one another.

Heater activation signals 135-1 through 135-3 respectively provided to heating segments 115-1 through 115-3 may be used to independently tune EAM segments 112-1 through 112-3 to different or same temperatures. In this implementation, control signal 137 may indicate to heater driver circuit 134 which of heating segments 115-1 through 115-3 is to be turned on or off to perform an adaptive adjustment for fine tuning of linearity of optical PAM4 amplitude levels.

Providing flexibility in compensating for both process variations through sizing of EAM segments 112 and temperature fluctuations through control of integrated heating segments 115 facilitates enhancing linearity of SEAM 120. An integrated heater 165 may be used to adjust temperature of heating segments 115-1 through 115-3 independently of one another through thermal controller circuit 136 and heater driver circuit 134, where heater driver circuit 134 has three separate drivers corresponding to heater segments 115-1 through 115-3. Thus, in addition to compensating for nonlinearity of SEAM 120 for optical PAM4 transmission without a having to have a DAC for such compensation, an integrated photodiode and separate heating elements may be used for adaptive thermal tuning for PAM4 modulation.

Figure 9:
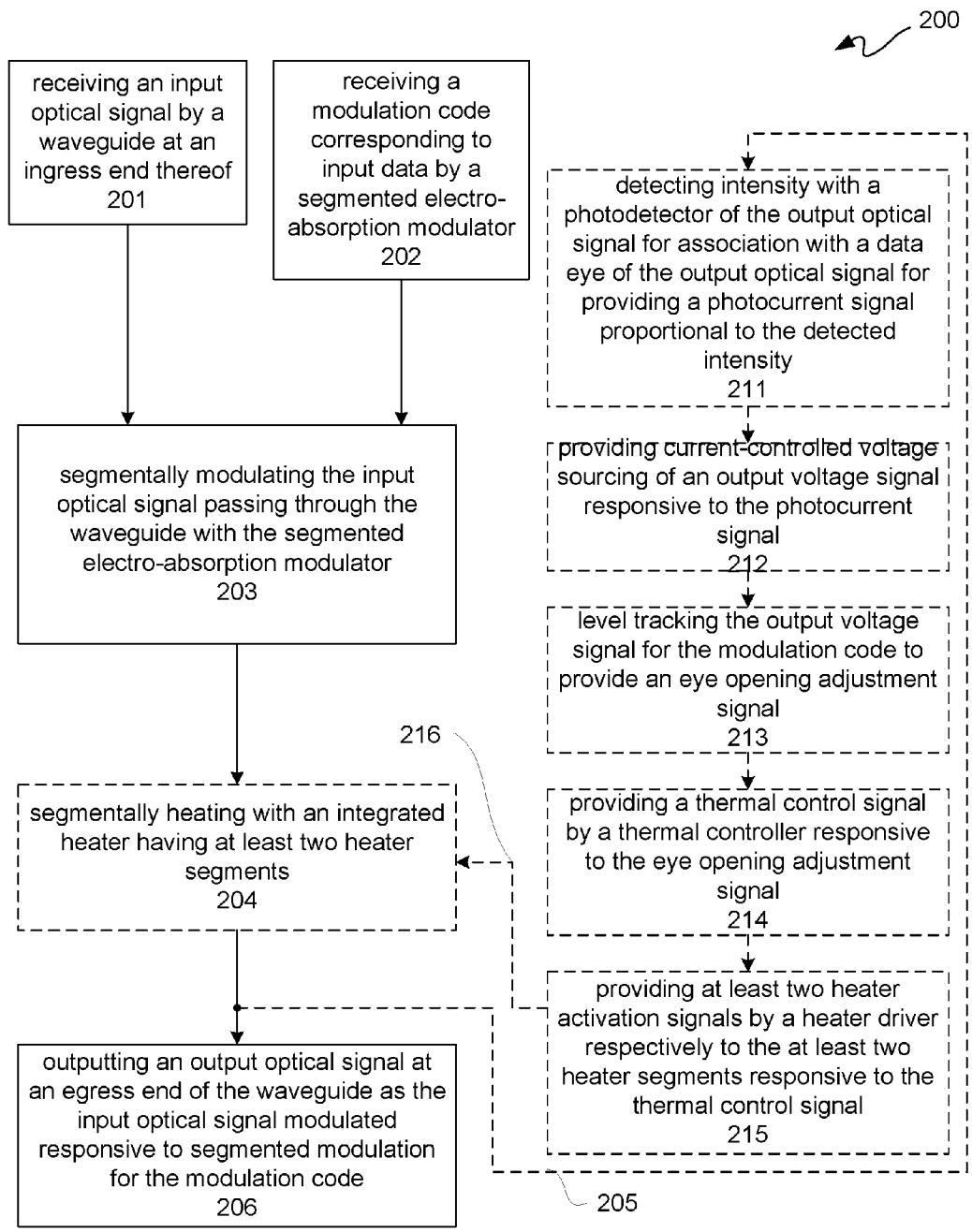
FIG. 9 is a flow diagram illustratively depicting an exemplary electro-absorption modulation process.

FIG. 9 is a flow diagram illustratively depicting an exemplary electro-absorption modulation process 200. FIG. 9 is further described with simultaneous reference to FIGS. 1 through 9.

At 201, an input optical signal 113 may be received by a waveguide 106 at an ingress end 156. At 202, generally at about the same time input optical signal 113 is received, a modulation code of encoded input 126 corresponding to input data 121 may be received by a SEAM 120.

At 203, input optical signal 113 may be segmentally modulated by SEAM 120 as such light signal passes through a corresponding portion of waveguide 106 with SEAM 120 adjacent to waveguide 106. Optionally, at 204, an integrated heater 165 having at least two heater segments 115 may be used for segmentally heating corresponding anode segments 111 and/or cathode segments 110, as previously described. Segmentally modulating, namely modulating segment-by-segment, at 203 may thus be performed with a SEAM 120 including anode, cathode and optional heater segments respectively aligned to one another to provide serial segmented modulation by at least two electro-absorption modulation segments 112 of SEAM 120. At 206, an output optical signal 114 may be output at an egress end 157 of waveguide 106 as input optical signal 113 modulated responsive to segmented modulation for such modulation code.

If, an optional segmented heating is used at 204, operations 211 through 215 may be used. Along those lines, as indicated by dashed line 205, an output optical signal 114 may be obtained and intensity thereof may be detected at 211 with a photodetector 118 of an output optical signal 114 prior to output at 206 for association with a data eye of such output optical signal 114 for providing a photocurrent signal 131 proportional to detected intensity. Photocurrent signal 131 for a data eye may be associated with a PAM having four or more distinct pulse amplitude levels.

At 212, current-controlled voltage sourcing of such an output voltage signal 114 may be performed responsive to photocurrent signal 131 using a TIA. At 213, level tracking of output voltage signal 114 for a modulation code may be performed to provide an eye opening adjustment signal 133 using level tracking circuit 130. At 214, a thermal control signal may be provided by a thermal controller circuit 136 responsive to such eye opening adjustment signal 133. At 215, least two heater activation signals 135 may be provided by a heater driver circuit 134 respectively to at least two heater segments 115, as generally indicated by dashed line 216, responsive to thermal control signal 137 for segmentally heating at 204.

Figures 1, 10:
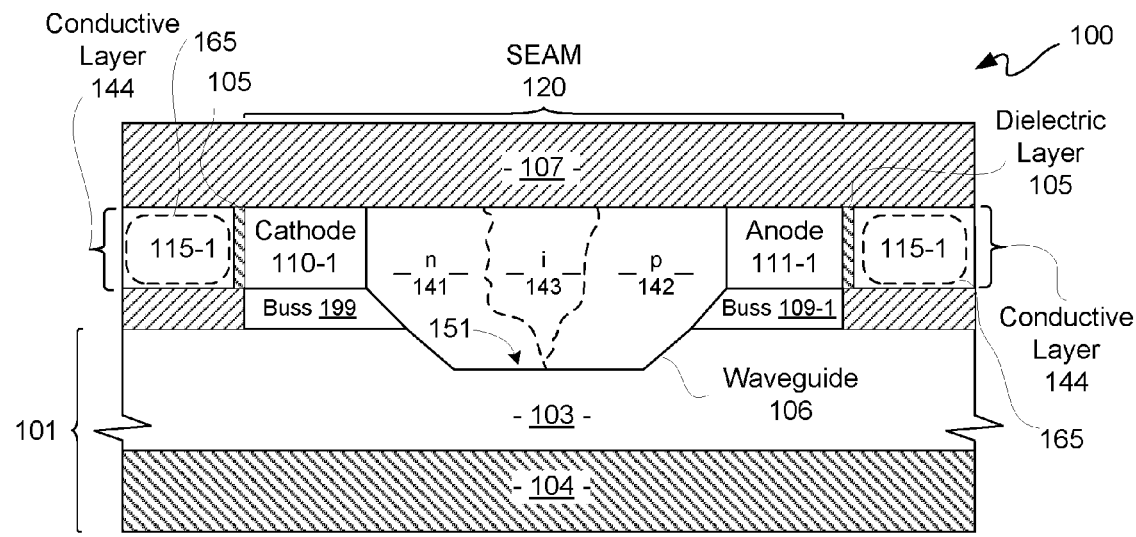
Figures 2, 10:
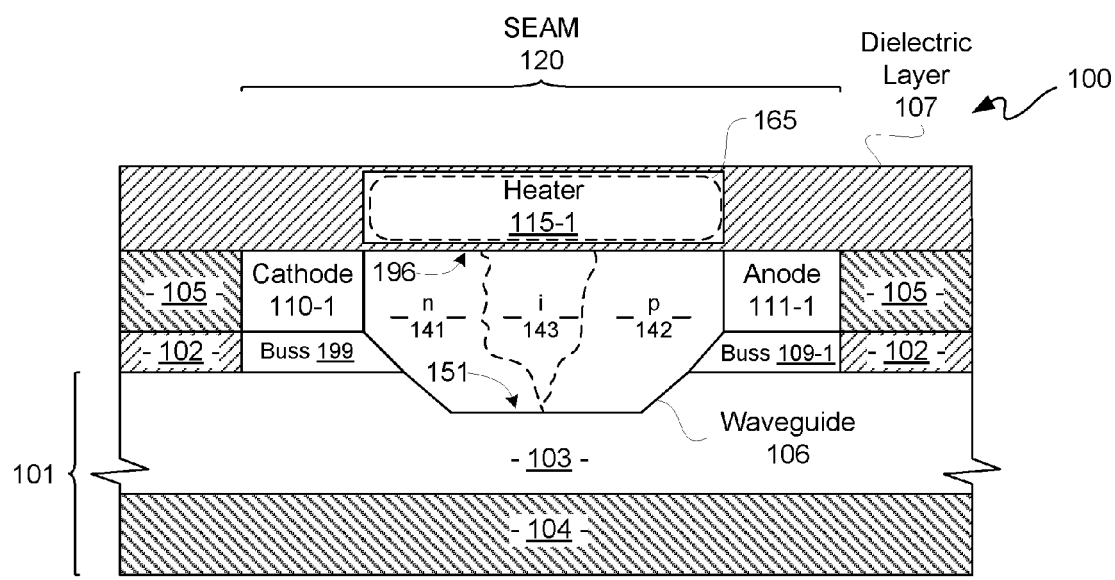
Figures 3, 10:
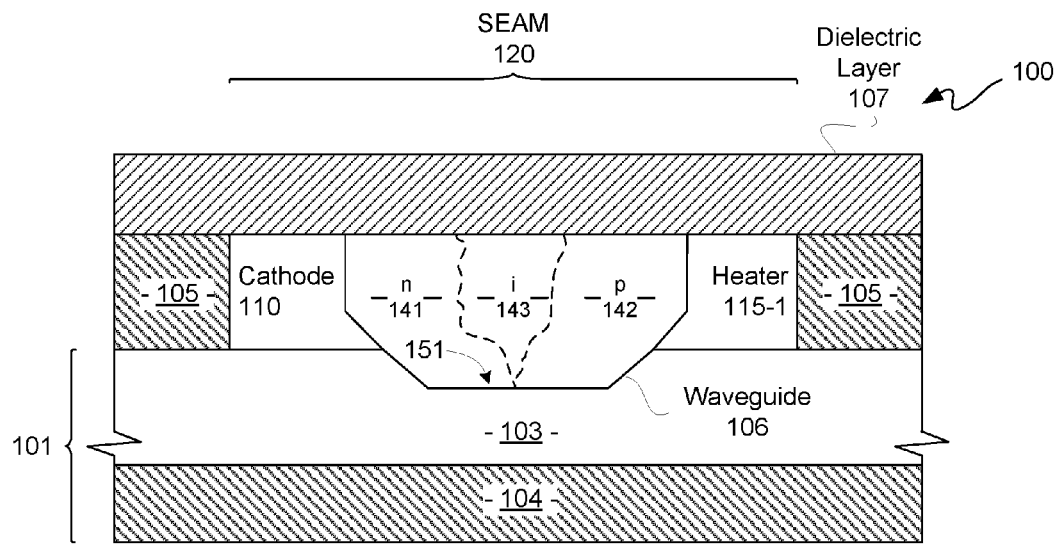

FIGS. 10-1 through 10-3 are respective block diagrams illustratively depicting end cross-sectional views of respective exemplary SEASs 100 each having a SEAM 120 with an optional integrated heater 165. FIGS. 10-1 and 10-2 are further described with simultaneous reference to FIGS. 1 through 9, where generally same description is not repeated for purposes of clarity and not limitation.

FIG. 10-1 is an exemplary cross-sectional view on end of a SEAS 100 of FIG. 6-1. As previously described, heater segments 115-1 may be respectively alongside a corresponding anode segment 111-1 and a corresponding cathode segment 110-1. In this implementation, conductive layer 144, which may be a metal layer, is used to form heater segments 115, as well as anode segments 111 and cathode segments 111, all in a same deposition operation, where a gap provided with dielectric layer 105 is used to provide electric isolation between heater segments 115 and corresponding anode and cathode segments. However, in another implementation, separate depositions may be used by masking. Rather than one or more metal layers used to form heating elements for heater segments 115 in a silicon photonics ("SiPh") implementation, in another implementation heater segments 115 may be formed using doped or undoped polycrystalline silicon ("poly"), such as poly resistors for example.

Having thermally conductive electrodes, such as metal electrodes provided as anode segments 110 and/or cathode segments 111, between one or more heater segments 115 and waveguide 106 may degrade efficiency of heater 165. In another implementation, heater segments 115 may directly overlap or be alongside waveguide 106 with or without direct contact with waveguide 106 and without intervening anode and/or cathode segments.

Along those lines, in FIG. 10-2, heater segment 115-1 is positioned over and above waveguide 106. Heater segment 115-1 of heater 165 may be spaced apart from an upper surface 196 of waveguide 106, such as by a portion of dielectric layer 107. However, in another implementation, heater segment 115-1 may be in direct contact with an upper surface 196 of waveguide 106. In either implementation, heater segment 115-1 overlaps an upper surface 196 of waveguide 106. A via or hole for heater segment 115-1 may be defined in dielectric layer 107 followed by deposition of a resistive and/or conductive material for providing a heating element. By having heater segment 115-1 overlap, as well as optionally completely span a width of waveguide 106, tuning efficiency of heater 165 may be enhanced.

Figures 1, 11:
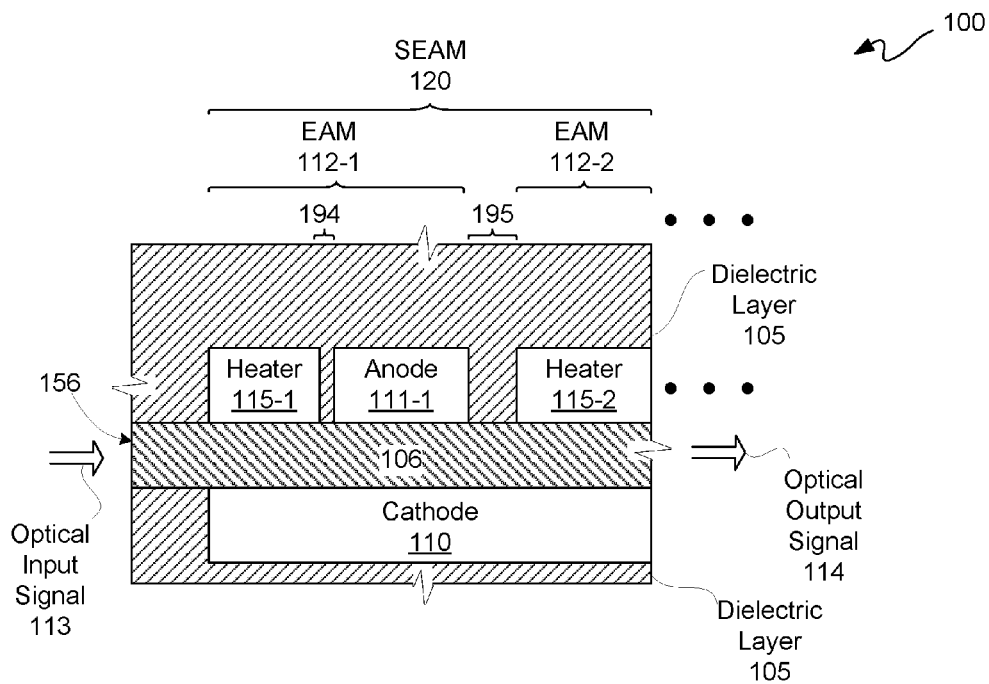
Figures 2, 11:
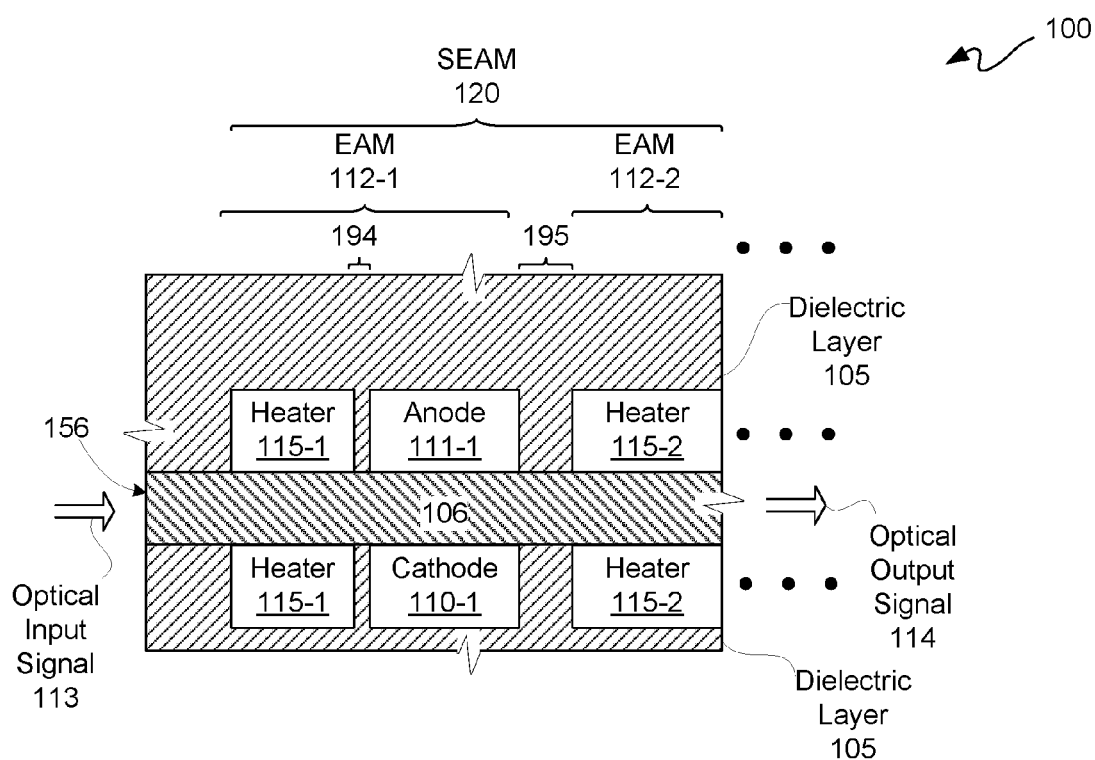

FIGS. 11-1 and 11-2 are respective block diagrams of top-down cross-sectional views illustratively depicting respective exemplary SEASs 100 each with an optional integrated heater 165 such as for SEAS 100 of FIG. 10-3. FIGS. 10-3, 11-2 and 11-2 are further described with simultaneous reference to FIGS. 1 through 11-2.

With reference to FIGS. 10-3 and 11-1, a unitary cathode 110 is formed in a via defined in dielectric layer 105 from a top surface thereof down to an upper surface of silicon layer 103 and lengthwise bordering a side portion of waveguide 106. At the same time a unitary cathode 110 via is formed, vias may be formed for anode segments 111 and heater segments 115. Moreover, rather than a unitary cathode 110, a segmented cathode may be formed as previously described and as illustratively depicted in FIG. 11-2.

Heater segments 115 may be interleaved with anode segments 111 on an anode side of waveguide 106. In an implementation with a segmented cathode as in FIG. 11-2, heater segments 115 may be interleaved with cathode segments 110 on a cathode side of waveguide 106. Moreover, for an implementation with a segmented anode and a segmented cathode, a set of heater segments 115 may be interleaved with anode segments 111, and another set of heater segments 115 may be interleaved with cathode segments 110. Cathode segments 110 and corresponding anode segments 111 may be latitudinally aligned to one another on opposing sides of waveguide 106, and heater segments 115 may be latitudinally aligned to one another with an intervening waveguide 106 between such aligned heater segments. In this implementation, anode segments 111 and corresponding heater segments 115 are in contact with a side of waveguide 106, and cathode segments 110 and corresponding heater segments 115 are in contact with an opposite side of waveguide 106. As these and other configurations follow from the description herein, such various configurations are not described in unnecessary detail for purposes of clarity and not limitation.

Generally heater segments 115 may be interleaved as spaced apart from corresponding anode and/or cathode electrodes, where such spacing may be provided by one or more dielectric layers for electrical isolation between neighboring segments. EAM segments 112 may each include a heater segment 115 and a corresponding electrode segment, which in this example for EAM segment 112-1 includes a heater segment 115-1 and an anode segment 111-1. A lengthwise gap 194 between a heater segment 115-1 and an anode segment 111-1 of an EAM segment 112-1 for example may be shorter than a lengthwise gap 195 between immediately neighboring EAM segments 112, such as for example EAM segment 112-1 and partial EAM segment 112-2. This separation may be for more individualized EAM and/or thermal control on an EAM segment-by-segment basis. In other words, a wider lengthwise gap reduces effects of electric field EAM and/or thermal overlap between neighboring EAM segments 112.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 12:
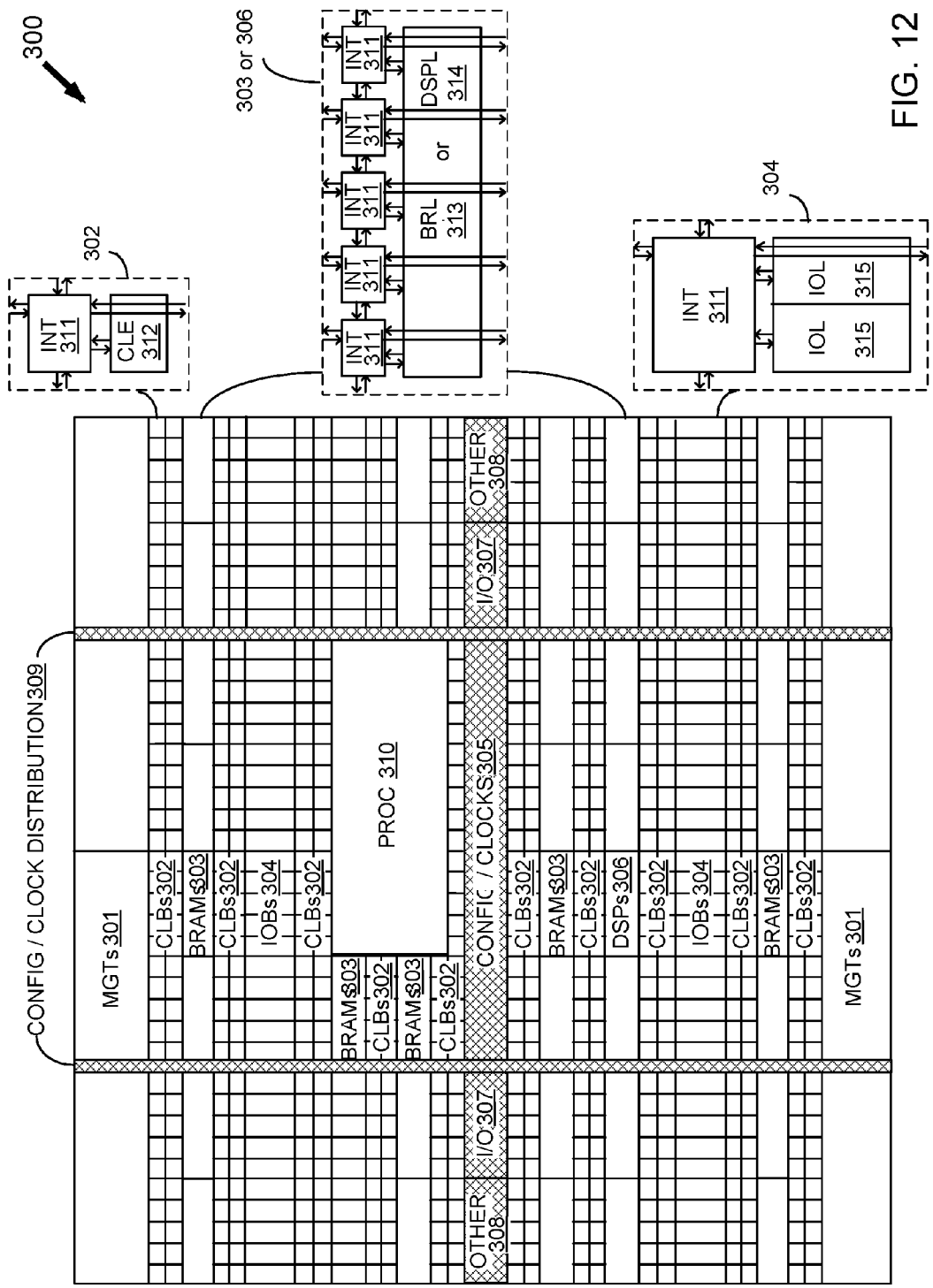
FIG. 12 is a simplified block diagram depicting an exemplary columnar Field Programmable Gate Array ("FPGA") architecture.

As noted above, advanced FPGAs can include several different types of programmable logic blocks in the array. For example, FIG. 12 illustrates an FPGA architecture 300 that includes a large number of different programmable tiles including multi-gigabit transceivers ("MGTs") 301, configurable logic blocks ("CLBs") 302, random access memory blocks ("BRAMs") 303, input/output blocks ("IOBs") 304, configuration and clocking logic ("CONFIG/CLOCKS") 305, digital signal processing blocks ("DSPs") 306, specialized input/output blocks ("I/O") 307 (e.g., configuration ports and clock ports), and other programmable logic 308 such as digital clock managers, analog-to-digital converters, system monitoring logic, and so forth. Some FPGAs also include dedicated processor blocks ("PROC") 310.

In some FPGAs, each programmable tile includes a programmable interconnect element ("INT") 311 having standardized connections to and from a corresponding interconnect element in each neighboring tile. Therefore, the programmable interconnect elements taken together implement the programmable interconnect structure for the illustrated FPGA. The programmable interconnect element 311 also includes the connections to and from the programmable logic element within the same tile, as shown by the examples included at the top of FIG. 12.

For example, a CLB 302 can include a configurable logic element ("CLE") 312 that can be programmed to implement user logic plus a single programmable interconnect element ("INT") 311. A BRAM 303 can include a BRAM logic element ("BRL") 313 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element ("DSPL") 314 in addition to an appropriate number of programmable interconnect elements. An 10B 304 can include, for example, two instances of an input/output logic element ("IOL") 315 in addition to one instance of the programmable interconnect element 311. As will be clear to those of skill in the art, the actual I/O pads connected, for example, to the I/O logic element 315 typically are not confined to the area of the input/output logic element 315.

In the pictured embodiment, a horizontal area near the center of the die (shown in FIG. 12) is used for configuration, clock, and other control logic. Vertical columns 309 extending from this horizontal area or column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic. For example, processor block 310 spans several columns of CLBs and BRAMs.

Note that FIG. 12 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 12 are purely exemplary. For example, in an actual FPGA more than one neighboring row of CLBs is typically included wherever the CLBs appear, to facilitate the efficient implementation of user logic, but the number of neighboring CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An electro-absorption modulation system, comprising:
a waveguide for propagating an optical signal;
a segmented electro-absorption modulator including:
  a segmented anode having first and second anode segments spaced apart from one another alongside a first side of the waveguide; and
  a segmented cathode having first and second cathode segments spaced apart from one another alongside a second side of the waveguide corresponding to the first and second anode segments;
  wherein a first electro-absorption modulation segment with a first length includes the first anode segment and the first cathode segment,
  wherein a second electro-absorption modulation segment with a second length includes the second anode segment and the second cathode segment, and
  wherein the segmented electro-absorption modulator is configured to compensate for nonlinearity by selecting a first number of the first and second electro-absorption modulation segments for modulation.

2. The electro-absorption modulation system according to claim 1, further comprising an integrated heater having first and second heater segments spaced apart from one another corresponding to the first and second anode segments.

3. The electro-absorption modulation system according to claim 2, wherein:
the waveguide has an ingress end configured for receiving an input optical signal and an egress end configured for outputting an output for the propagating of the optical signal;
the segmented electro-absorption modulator located with respect to the waveguide for segmentally affecting the absorption coefficient thereof;
the segmented anode has the first and second anode segments located side-by-side lengthwise spaced apart from one another alongside the first side of the waveguide;
the segmented cathode has first and second cathode segments located side-by-side lengthwise spaced apart from one another alongside the second side of the waveguide corresponding to the first and second anode segments, the second side of the waveguide being opposite the first side of the waveguide;
pairs of the first and second anode and cathode segments are respectively aligned to one another for providing a series of the first and second electro-absorption modulation segments longitudinally alongside the waveguide;
the integrated heater has the first and second heater segments spaced apart from one another located side-by-side lengthwise alongside and corresponding to the first and second anode segments;
the anode, cathode and heater segments are respectively aligned to one another for providing the series of the first and second electro-absorption modulation segments;
the anode, cathode and heater segments respectively aligned to one another; and
the heater segments are interleaved with the anode segments.

4. The electro-absorption modulation system according to claim 1, further comprising an integrated heater having first and second heater segments spaced apart from one another corresponding to the first and second cathode segments.

5. The electro-absorption modulation system according to claim 4, wherein:
the waveguide has an ingress end configured for receiving an input optical signal and an egress end configured for outputting an output for the propagating of the optical signal;
the segmented electro-absorption modulator located with respect to the waveguide for segmentally affecting the absorption coefficient thereof;
the segmented anode has the first and second anode segments located side-by-side lengthwise spaced apart from one another alongside the first side of the waveguide;
the segmented cathode has first and second cathode segments located side-by-side lengthwise spaced apart from one another alongside the second side of the waveguide corresponding to the first and second anode segments, the second side of the waveguide being opposite the first side of the waveguide;
pairs of the first and second anode and cathode segments are respectively aligned to one another for providing a series of first and second electro-absorption modulation segments longitudinally alongside the waveguide;
the integrated heater has the first and second heater segments spaced apart from one another located side-by-side lengthwise alongside and corresponding to the first and second cathode segments;
the anode, cathode and heater segments are respectively aligned to one another for providing the series of the first and second electro-absorption modulation segments;
the heater segments are interleaved with the cathode segments; and the anode, cathode and heater segments respectively aligned to one another.

6. The electro-absorption modulation system according to claim 1, wherein the first and second lengths are different.

7. The electro-absorption modulation system according to claim 1, wherein the first and second lengths are the same.

8. The electro-absorption modulation system according to claim 1, further comprising an integrated heater overlapping an upper surface of the waveguide.

9. The electro-absorption modulation system according to claim 1, wherein the first and second electro-absorption modulation segments are configured to provide a thermometer code for an incremental progression of absorption states along the waveguide.

10. The electro-absorption modulation system according to claim 1, wherein the first and second anode segments are electrically coupled to separate source nodes.

11. The electro-absorption modulation system according to claim 10, further comprising:
a photodetector proximate to an egress end of the waveguide having a detector anode located alongside the first side of the waveguide and a detector cathode located alongside the second side of the waveguide;
the photodetector configured to provide a photocurrent signal proportional to intensity of an output optical signal;
an integrated heater having first and second heater segments located side-by-side corresponding to at least one of the first and second anode segments and the first and second cathode segments, respectively;
a current-controlled voltage source configured to receive the photocurrent signal to provide an output voltage signal;
a level tracking circuit configured to receive the output voltage signal to provide an eye opening adjustment signal;
a thermal controller configured to receive the eye opening adjustment signal to provide a thermal control signal; and
a heater driver configured to receive the thermal control signal to provide first and second heater activation signals corresponding to the first and second heater segments.

12. An electro-absorption modulation system, comprising:
a waveguide for propagating an optical signal; and
a segmented electro-absorption modulator including:
a segmented anode having first and second anode segments located spaced apart from one another alongside a first side of the waveguide; and
a non-segmented cathode located alongside a second side of the waveguide corresponding to the first and second anode segments;
wherein the segmented electro-absorption modulator is configured to compensate for nonlinearity by selecting a first number of the first and second anode segments for modulation.

13. The electro-absorption modulation system according to claim 12, further comprising an integrated heater having first and second heater segments spaced apart from one another corresponding to the first and second anode segments.

14. The electro-absorption modulation system according to claim 12, further comprising an integrated heater overlapping an upper surface of the waveguide.

15. A method for electro-absorption modulation, comprising:
receiving an input optical signal by a waveguide;
receiving a modulation code corresponding to input data by a segmented electro-absorption modulator including a first electro-absorption modulation segment and a second electro-absorption modulation segment,
wherein the first electro-absorption modulation segment includes a first anode segment and a first cathode segment, and
wherein the second electro-absorption modulation segment includes a second anode segment and a second cathode segment;
compensating for nonlinearity of the segmented electro-absorption modulator by selecting a first number of the first and second electro-absorption modulation segments for modulation; and
modulating the input optical signal passing through the waveguide segment-by-segment with the segmented electro-absorption modulator to generate an output optical signal.

16. The method according to claim 15, further comprising heating with an integrated heater having first and second heater segments corresponding to either or both sets of the first and second anode segments or the first and second cathode segments.

17. The method according to claim 16, further comprising detecting intensity with a photodetector of the output optical signal for association with a data eye of the output optical signal for providing a photocurrent signal proportional to the intensity detected.

18. The method according to claim 17, further comprising:
providing a current-controlled voltage sourcing of an output voltage signal responsive to the photocurrent signal;
level tracking the output voltage signal for the modulation code to provide an eye opening adjustment signal;
providing a thermal control signal by a thermal controller responsive to the eye opening adjustment signal; and
providing first and second heater activation signals by a heater driver respectively to the first and second heater segments responsive to the thermal control signal.

19. The method according to claim 17, wherein the modulating comprises configuring the segmented electro-absorption modulator to include:
a segmented anode having first and second anode segments located side-by-side lengthwise alongside a first side of the waveguide; and
a segmented cathode having first and second cathode segments alongside a second side of the waveguide corresponding to the first and second anode segments.

20. The method according to claim 19, wherein the modulating further comprises configuring the segmented electro-absorption modulator to include a photodetector having a detector anode located alongside the first side of the waveguide and a detector cathode located alongside the second side of the waveguide.

* * * * *